US006672357B2

(12) United States Patent
Yokozawa et al.

(10) Patent No.: US 6,672,357 B2
(45) Date of Patent: Jan. 6, 2004

(54) HOT-STAMPING DEVICE

(75) Inventors: Mitsuo Yokozawa, Hara-mura (JP); Kiyotsugu Takasawa, Hara-mura (JP); Yukio Kuroiwa, Hara-mura (JP); Fumito Komatsu, Hara-mura (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 180 days.

(21) Appl. No.: 10/066,083

(22) Filed: Oct. 24, 2001

(65) Prior Publication Data

US 2002/0124942 A1 Sep. 12, 2002

(30) Foreign Application Priority Data

Oct. 25, 2000 (JP) ....................................... 2000-325206
Oct. 31, 2000 (JP) ....................................... 2000-333689

(51) Int. Cl.[7] .......................... B44C 1/16; B32B 31/20; B30B 1/06; B41F 1/00; B41J 11/14

(52) U.S. Cl. ....................... 156/540; 156/543; 156/580; 156/230; 101/33; 101/34; 101/27; 101/292; 101/297; 400/118.1; 400/127; 400/648; 400/657

(58) Field of Search ................................ 156/350, 384, 156/510, 540, 543, 580, 230, 277, 361, DIG. 11, DIG. 2, DIG. 33; 101/27, 31.1, 32, 33, 34, 288, 297, 197, 316, 292; 400/118.1, 127, 31, 365, 648, 653

(56) References Cited

U.S. PATENT DOCUMENTS

| | | | | | |
|---|---|---|---|---|---|
| 3,415,183 | A | * | 12/1968 | Dudley | 101/68 |
| 3,657,051 | A | | 4/1972 | McCarthy | |
| 3,916,783 | A | | 11/1975 | Filsinger et al. | |
| 4,048,913 | A | * | 9/1977 | Navi | 101/27 |
| 4,930,911 | A | * | 6/1990 | Sampson et al. | 400/28 |
| 5,441,589 | A | * | 8/1995 | Groswith et al. | 156/542 |

FOREIGN PATENT DOCUMENTS

| | | | | |
|---|---|---|---|---|
| JP | 05-021529 | | 1/1993 | |
| JP | 2001-30465 | * | 2/2001 | B41F/16/00 |
| WO | WO 95/04657 | | 2/1995 | |

* cited by examiner

*Primary Examiner*—J. A. Lorengo
(74) *Attorney, Agent, or Firm*—Reed Smith, LLP

(57) ABSTRACT

This invention relates to a hot-stamping device comprising a stamping arm with one end being a free end, a stamping section adapted to apply pressure to a hot-stamping foil positioned at the free end to a value-added medium such as ticket wherein the hot-stamping foil is transferred to the value-added medium. A first cam, in contact with said stamping arm, is used for moving a stamping section to close proximity of the value-added medium. A first drive section driving said first cam and a second cam for bringing pressure-exerting load to bear on the stamping section is used to move to close proximity a value-added medium. A second drive section is used for driving a second cam.

6 Claims, 23 Drawing Sheets

HOT-STAMPING DEVICE

RELATED PATENTS AND APPLICATIONS

This application claims priority of Japanese Patent Application No. 2000-325206 filed on Oct. 25, 2000 and Japanese Patent Application No. 2000-333689 filed on Oct. 31, 2000, the complete disclosures of which are hereby incorporated by reference.

FIELD OF THE INVENTION

This invention relates to the field of a hot-stamping device for transferring a hot-stamping foil to a value-added medium.

BACKGROUND OF THE INVENTION

An example of a conventional a hot-stamping device for transfer of holographic foil to a value-added medium, such as official documents and the like is the disclosure in International Patent Application WO95/04657. Here, documents becoming hot-stamping objects have a thickness and a width, for example, from single sheets to brochures. In said hot-stamping device, hot-stamping is performed on said documents by the following construction.

A large-size cam structure and a large-size motor are utilized so that a stamping at the load required for a hot-stamping can be effected in a stroke range corresponding to assumed thickness of the documents. Further, the construction is such that pressure greater than a required stamping load is applied, and excess stamping load is absorbed by a spring section built into a bottom stand. Further, a stamping stand and a load cam are arranged in a straight line so that rigidity of the entire device is high enough to withstand a large stamping load.

Hot-stamping device 301 shown in FIG. 23 is a device for transfer by a pressure application of a hot-stamping foil 303 such as holographic foil and the like to a value-added medium 302 such as tickets and cards of various kinds as well as official documents and the like, drive motor 305 drives cam 306 to rotate, a required load for hot-stamping acts on stamping section 304 to transfer hot-stamping foil 303 to a value-added medium 302 Further, in hot-stamping device 301, a load acting on stamping section 304 is a predetermined fixed load, uniform hot-stamping is thereby implemented. In hot-stamping device 301, when motor shaft 308 is locked when stamping section 304 comes in contact with object section 307 through value-added medium 302 and hot-stamping foil 303, an increase in electric current going through motor 305 is detected, and current through motor 305 is adjusted.

Next, although not a hot-stamping device, a bonding device disclosed in Japanese Laid-open Patent (Kokai) Hei 5-21529 uses a load cell to determine the value of applied pressure in the pressure application section. This value of applied pressure is compared to the predetermined value of applied pressure, and a pressure application section is activated so that the respective values of applied pressure are in agreement.

Nonetheless, in the conventional hot-stamping device, a load required for stamping is adequately obtainable from utilization of a large-size cam structure and large-size motor, but there are problems with such an increase in size of the device, an increase in manufacturing cost, and an increase in product weight.

Further, in a construction wherein an excess stamping load is absorbed by means of a spring section built in a bottom stand, there are cases where documents are bent or creased when there are changes in the position of a face acting as a stamping base. Further, because there is a repeated load application on a hard compression spring, it cannot be said that this a construction with long product life or high reliability. Moreover, because of inertial effect upon movement of the stamping stand, it is difficult to implement a continual stamping at a fixed load.

Further, although positioning a stamping stand and load cam in a straight line is effective from the standpoint of rigidity, there is the problem that the entire device becomes large in size. Further, in a hot-stamping device with a structure having such an arrangement, it becomes necessary to set the holographic foil by, as it were, stitching the various structural parts together; therefore, there is the problem that an exchange of holographic foil can only be done by skilled persons or professional service providers.

The pressure necessary for the transfer of a hot-stamping foil (for example, holographic foil and the like) varies with the kind of hot-stamping foil, further, permissible applied pressure varies with the kind of value-added medium (for example, ticket paper and plastic cards and the like) comprising the stamping object. In other words, the most suitable applied pressure that can transfer hot-stamping foil in satisfactory fashion, and which does not damage value-added medium, varies with the kind of hot-stamping foil and value-added medium.

However, in a hot-stamping device shown in FIG. 23, there is no way to control the application of stamping pressure appropriately, in response to the kind of hot-stamping foil and the kind of a value-added medium. In hot-stamping device 301 shown in FIG. 23, the relationship between the electric current in motor 305 and the load acting on stamping section 304 is not known, consequently, it is difficult to control application of stamping pressure accurately.

Therefore, as in a bonding device disclosed in Japanese Laid-open Patent (Kokai) Hei 5-21529, one thought is to use a load cell to measure the pressure-exerting load of the stamping section, compare this pressure-exerting load and the required fixed load, and operate the stamping section so the pressure-exerting load matches the fixed load, but when this control is utilized in the hot-stamping device without modification, the following problems are present.

In other words, when a stamping section is used in the one hot-stamping device constitutes a multiplicity of stamping sections with various respective sizes or when there is engraving on the stamping face, the area of the part in the stamping section that comes in contact with the value-added medium at the time of hot-stamping (hereinafter, termed stamping area in this specification) varies. Because of this, even when a fixed load is activated, the load generated per unit area in the stamping section at time of hot-stamping, in other words, pressure (hereinafter, termed stamping pressure in this specification) is not constant. In other words, even when a fixed load is activated, the stamping pressure is small in a stamping section with a large stamping area, the stamping pressure is large in stamping section with a small stamping area, so uniform hot-stamping cannot be implemented. Because of this, stamping pressure is weak and satisfactory transfer of hot-stamping foil does not occur. Alternatively, stamping pressure is too strong so there is concern of damage to the value-added medium and stamping section.

SUMMARY OF THE INVENTION

Therefore, this invention provides a hot-stamping device which, although small in size, is able to perform hot-stamping at a high speed and moreover in a satisfactory fashion at a stamping load adequate for a value-added medium having a thickness and width, furthermore, exchange of hot-stamping foil is performed easily.

Further, this invention provides a hot-stamping device and a stamping pressure control method for a hot-stamping device wherein regardless of how big or how small the size of the stamping section or the shape of stamping face, etc., uniform hot-stamping can be performed at an optimal stamping pressure.

To achieve the above, a hot-stamping device described has a stamping arm with one end being a free end, and stamping section positioned at said free end that applies pressure to a hot-stamping foil and a value-added medium to transfer a hot-stamping foil to a value-added medium, and a first cam in contact with a stamping arm to move a stamping section to close proximity of value-added medium, and a first drive section driving said the first cam, and a second cam bringing pressure-exerting load to bear on a stamping section moved to close proximity of the value-added medium, and a second drive section driving the second cam.

Consequently, a high-speed cam, in other words, the first cam used to move a stamping section, and a high-load cam, in other words, the second cam used to exert pressure on a stamping section, are used accordingly, and a stamping section is moved quickly to close proximity of a value-added medium by means of the first cam. The load for exerting pressure necessary for hot-stamping is generated by means of the second cam.

Further, in the invention a hot-stamping foil may comprise a hot-stamping foil tape, said hot-stamping foil tape is stored in cassette equipped with windup reel and sendout reel. Consequently, when there is changeover to a different hot-stamping foil tape, the task is easily performed by exchanging cassettes.

Further, in the invention a cassette may move to come in contact with value-added medium by means of the first cam drive. Consequently, a value-added medium is fixed, and shifting in a hot-stamping can be prevented. Further, when a hot-stamping foil tape is peeled off a value-added medium, floating of value-added medium is prevented.

Further, the invention may include a hot-stamping base position positioned where a cassette comes in contact with a value-added medium, a stamping section is moved to a base position by means of the first cam drive, at a base position, a load exerting pressure is brought to bear on a stamping section by means of the second cam drive. Consequently, a constant pressure-exerting load can be brought to bear continually at a level having no problems in practical use, even when the value-added medium has a thickness and a width.

To achieve such objectives, in a hot-stamping device having a stamping arm with one end being a free end, and a stamping section positioned at said free end to transfer hot-stamping foil to value-added medium, and a pressure application mechanism in contact with stamping arm to bring pressure-exerting load to bear on stamping section, and a drive section driving pressure application mechanism, a strain detection device is attached to a stamping arm, a stamping pressure of a stamping section at time of hot-stamping transfer is measured from an output of strain detection device, required amount of pressure application is obtained by comparing stamping pressure and predetermined target pressure, a required amount of pressure application is applied to the stamping section, and a drive section is controlled in this way.

Consequently, an amount of strain on a stamping arm may be detected by a strain detection device, a size of load generated in stamping section in response to this strain is obtained, this load is divided by a stamping area, a stamping pressure comprising load per unit area generated in the stamping section can be measured. By measuring a stamping pressure and adjusting a drive section so that stamping pressure matches target pressure comprising optimal pressure, obtained beforehand in accordance with hot-stamping foil and value-added medium, or is within the fixed range having target pressure as base, it is possible to effect a uniform hot-stamping at an optimal stamping pressure regardless of the size of the stamping area.

Further, a memory storage device to store stamping area of stamping section may be provided. Consequently, in the hot-stamping process, the user does not need to input a stamping area to measure a stamping pressure comprising load per unit area generated in the stamping section. Further, when a target pressure comprising an optimal pressure in accordance with hot-stamping foil and value-added medium is multiplied by a stamping area, a target load required to act on hot-stamping section can be obtained.

Further, in a stamping pressure control method for a hot-stamping device, a hot-stamping device having a stamping arm with one end being a free end, and a stamping section positioned at said free end to transfer a hot-stamping foil to a value-added medium, and a pressure application mechanism in contact with a stamping arm to bring pressure-exerting load to bear on a stamping section, and a drive section driving a pressure application mechanism, a strain detection device is attached to a stamping arm, a stamping load of a stamping section at time of a hot-stamping transfer is measured from an output of a strain detection device, a target load is obtained by multiplying predetermined target pressure by a stamping area of a stamping section, a required load is obtained by comparing stamping load and a target pressure, a required load is applied to a stamping section, thus, a drive section is controlled in this way.

Consequently, by detecting an amount of strain on a stamping arm by a strain detection device, measuring a stamping load generated in a stamping section in response to this strain, and adjusting a drive section so a stamping load matches target load or is within the fixed range having the target load as a base, it is possible to perform a uniform hot-stamping at an optimal stamping pressure regardless of the size of the stamping area.

DETAILED DESCRIPTION OF THE PREFERRED EMBODIMENTS

Figure 1:
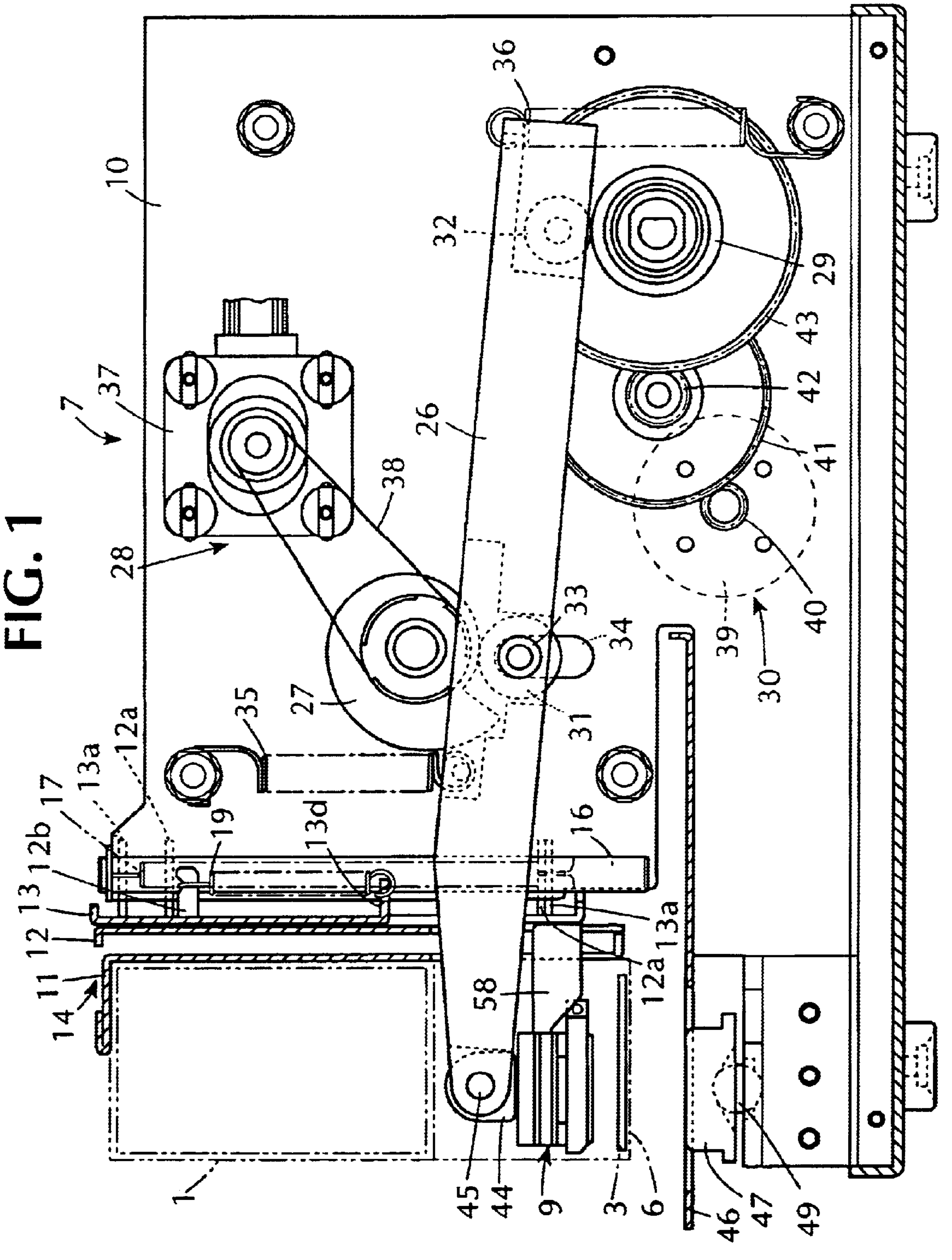
FIG. 1 is a simplified cross-sectional view showing a hot-stamping device in a readiness state.
Figure 2:
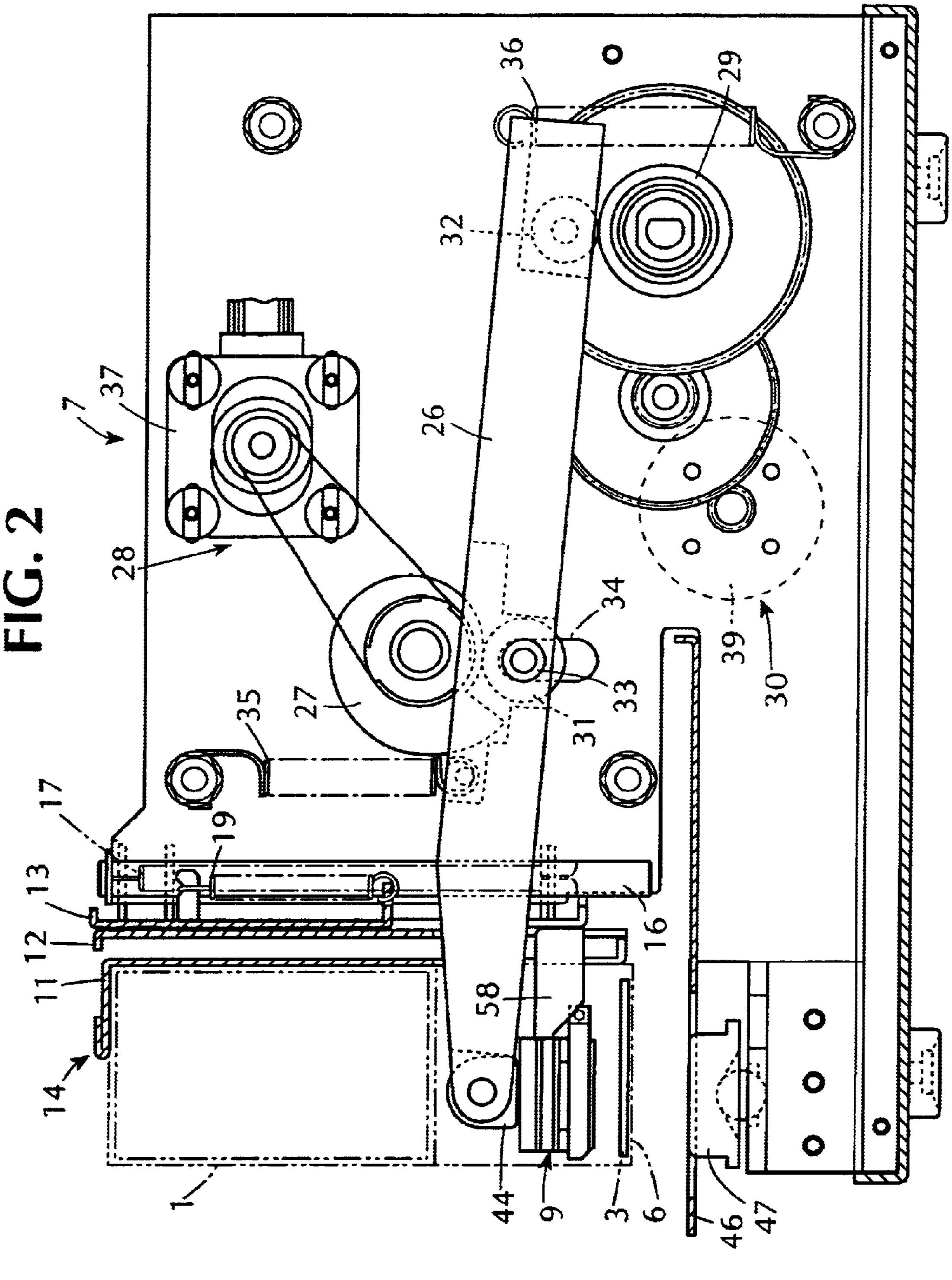
FIG. 2 is a simplified cross-sectional view of said hot-stamping device, showing the state when an insertion block from the state in FIG. 1 comes in contact with stamping section.
Figure 3:
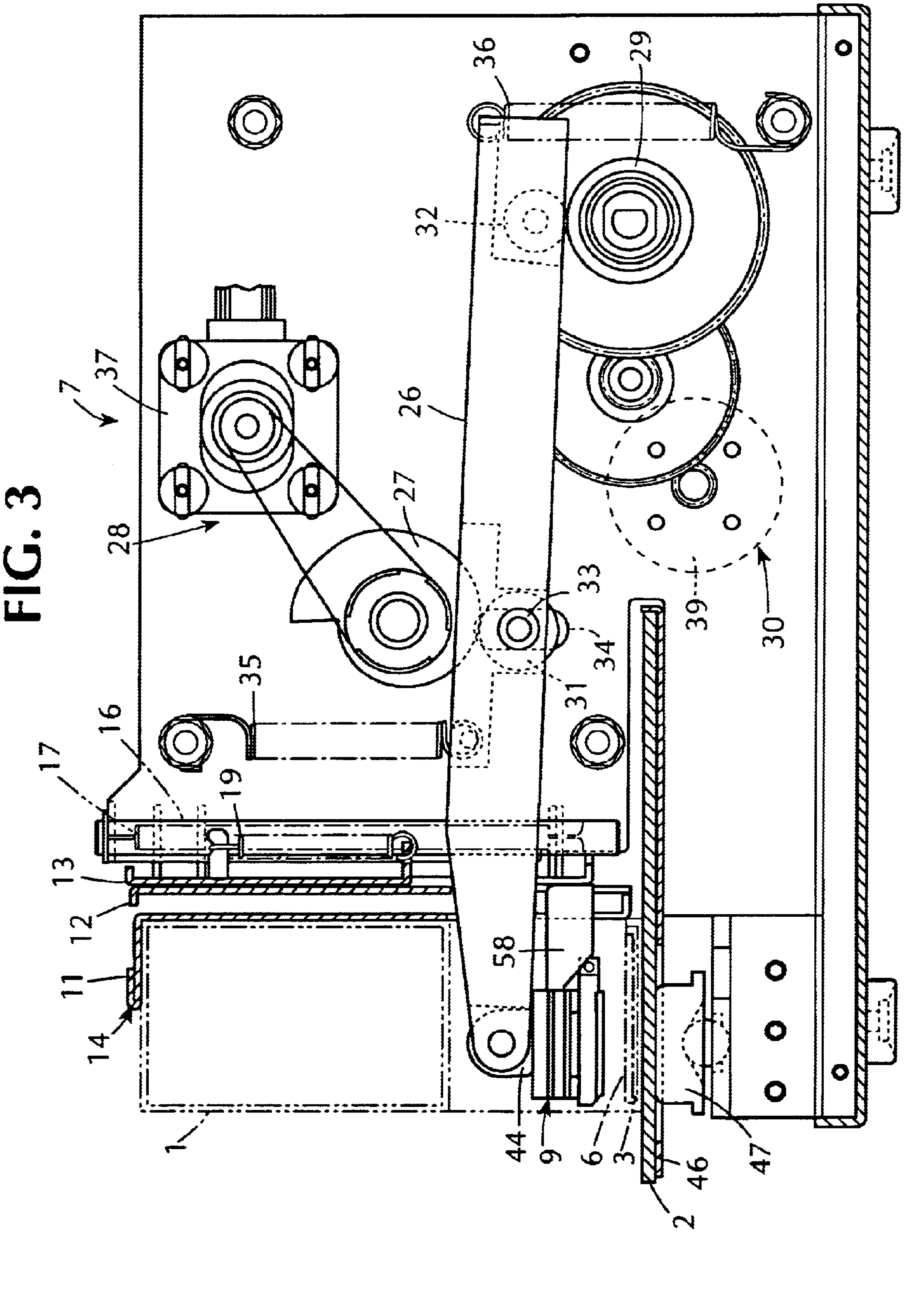
FIG. 3 is simplified cross-sectional view from the side of said hot-stamping device, showing the state when cassette from state in FIG. 2 comes in contact with value-added medium.

Below, the constitution and best mode of this invention is explained in detail based on an embodiment shown in the figures.

One embodiment of a hot-stamping device of this invention is shown in FIGS. 1 to 17. This hot-stamping device 7 has a stamping arm 26 with one end being a free end, and stamping section 9 positioned at said free end to apply pressure to a hot-stamping foil 3 and a value-added medium 2 to transfer a hot-stamping foil 3 to a value-added medium 2, and a first cam 27 in contact with a stamping arm 26 to move a stamping section 9 to close proximity of a value-added medium 2, and a first drive section 28 driving first cam 27, and second cam 29 bringing pressure-exerting load to bear on a stamping section 9 moved to a close proximity of value-added medium 2, and a second drive section 30 driving a second cam 29.

The value-added medium 2 comprising the hot-stamping object is a medium having value as protection from wrongdoing such as forgery or as a medium guaranteeing or certifying a fixed value by affixing a hot-stamping foil. There are no limitations in particular on the kind or the form of the medium. As such, value-added medium 2, are, for example, negotiable instruments such as tickets, gift certificates, cards such as credit cards and the like, documents such as certificates, confidential documents, official documents and the like. In this embodiment, as value-added medium 2, explanation is made with examples where documents are hot-stamping objects, in other words, documents from single sheets to brochures, having respective thicknesses and widths. Below, in this embodiment, a value-added medium will be termed document 2.

Further, in this embodiment, a hot-stamping foil comprises hot-stamping foil tape 3, hot-stamping foil tape 3 which is stored in cassette 1 and provided with a windup reel 4 and sendout reel 5. Cassette 1 can be attached to or detached from a hot-stamping device 7. By having hot-stamping foil tape in the form of cassette, it is, for example, easy to effect changeover to a hot-stamping foil tape 3 with a different pattern by exchanging cassette 1. Further, because hot-stamping foil tape 3 is stored in cassette 1, hot-stamping foil tape 3 cannot be removed by itself, misuse of tape 3 can be prevented. Hot-stamping foil is, for example, holographic foil with vapor-deposited layer of aluminum and the like. Hot-stamping foil tape 3 is constructed by supporting holographic foil on a carrier film comprising a transparent film.

Stamping arm 26 of this embodiment is equipped, for example, with a cam follower 31 in contact with a first cam 27 and cam follower 32 in contact with second cam 29. There is space on stamping arm 26 to attach cam follower 31 and cam follower 32. Cam follower 31 and cam follower 32 are, for example, both constructed of rollers. Cam follower 31 is attached about midway along the lengthwise direction of stamping arm 26, cam follower 32 is attached near the back end of stamping arm 26; each of these rotates freely. Further, bearing 33 is attached on the side face of stamping arm 26, on the same shaft as cam follower 31. Bearing 33 is fitted so it can flex, in long hole 34 formed in frame 10.

As shown in FIG. 1 in this embodiment, for example, first cam 27 is positioned in the figure about midway above the lengthwise direction of stamping arm 26, second cam 29 in the figure is positioned below near the back end of stamping arm 26. Then, in stamping arm 26, torsion coil spring 35, for example, is attached as a means to add force to receive force in the upward direction in the figure, further, torsion coil spring 36, for example, is attached as a means to add force to receive force in the downward direction in the figure. By these means, cam follower 31 comes in contact with first cam 27, cam follower 32 comes in contact with second cam 29, to determine the position for stamping arm 26.

When first cam 27 is driven, contact point between second cam 29 and stamping arm 26 (cam follower 32) becomes the fulcrum of rotation of stamping arm 26, on the other hand, when second cam 29 is driven, the contact point between first cam 27 and stamping arm 26 (cam follower 31) becomes the fulcrum of rotation of stamping arm 26.

Further, in this embodiment the change in radius per angle of rotation (change in radius/angle) for first cam 27 is designed to be large so that movement of stamping arm 26 can be effected quickly, on the other hand, the change in radius per angle of rotation for second cam 29 is designed to be small so that large load can be brought to bear on stamping arm 26. By this means, when first cam 27 is driven, stamping section 9 is moved quickly to close proximity of the medium, when second cam 29 is driven, large pressure-exerting load is brought to bear on stamping section 9.

Drive section 28 in this embodiment, for example, is constructed by using stepper motor 37. Rotation of stepper motor 37 is conveyed to first cam 27 by using, for example, timing belt 38. Moreover, there is no need to restrict usage to timing belt 38, for example, rotation of stepper motor 37 is conveyed in satisfactory fashion to first cam 27 by using a gear, chain, and the like. It becomes possible to rotate first cam 27 to the required degree by managing input pulse count to stepper motor 37.

Drive section 30 in this embodiment, for example, is constructed by using DC motor 39. Rotation of DC motor 39 is conveyed, for example, to second cam 29 through gear 40~43. Further, in this embodiment, drive section 28 enables control of the forward/reverse rotation of first cam 27 by using stepper motor 37, and on the other hand, drive section 30 rotates second cam 29 in one direction only, change in radius per angle of rotation is small in second cam 29. By this means, for example, when second cam 29 is rotated ¾ turn, there is no need to return to the starting state by reverse ¾ turn rotation, rotating another ¼ turn suffices. By this means, it is possible to accelerate the process. Further, because it is sufficient to control rotation in one direction, drive section 30 can be constructed at low cost and in simple fashion. Moreover, in drive section 30, there is no need to restrict usage to DC motor 39, for example, it is possible to use an AC motor.

Figure 17A:
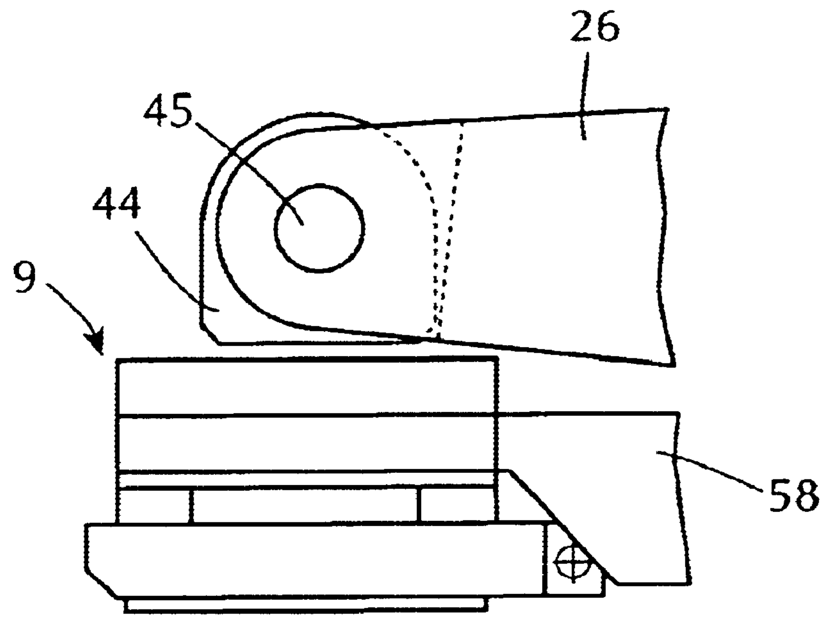
FIG. 17(A) shows state of close proximity of stamping section when hot-stamping device is in readiness state
Figure 17B:
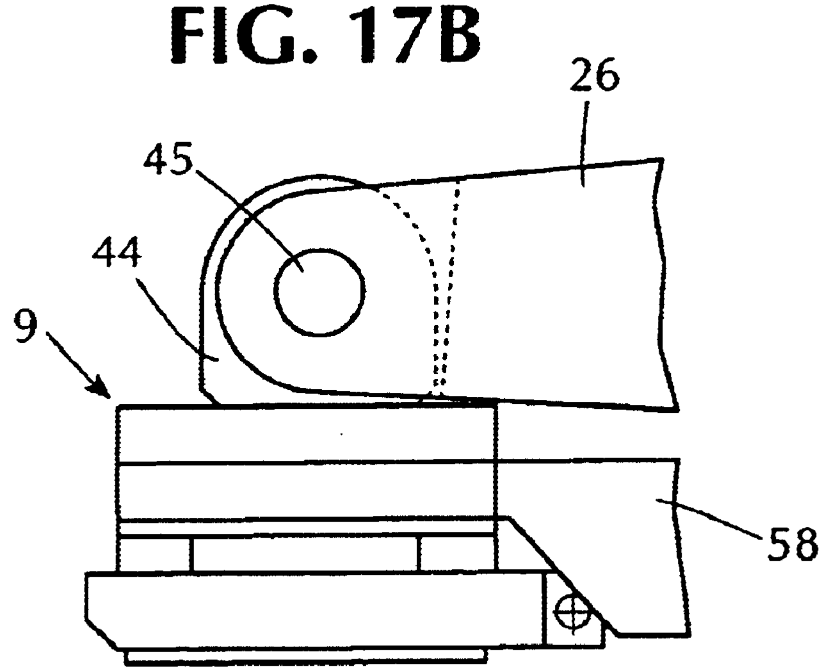
FIG. 17(B) shows state of close proximity of stamping section at time of hot-stamping action.

In this embodiment, stamping section 9 is not directly attached to stamping arm 26, insertion block 44 inserts stamping section 9 at time of hot-stamping; on the other hand, in the readiness state, as shown in FIG. 17(A), there is space (for example, 0.5 mm in this embodiment) deliberately placed between the respective contact faces of stamping section 9 and insertion block 44. By such construction, when the temperature of stamping section 9 is raised, heat does not escape to the side of stamping arm 26.

Insertion block 44 is attached to the leading edge section of stamping arm 26 so free rotation occurs, for example, with shaft 45 as the center. Insertion block 44 is allowed to rotate freely so a contact face to stamping section 9 is kept horizontal independently of the position of stamping arm 26.

Stamping section 9 comprises stamping block constructed of, for example, a heating plate contacting the hot-stamping foil at the time of stamping, and a ceramic heater heating the heating plate, and a thermistor measuring the temperature of the heating plate, and an adiabatic plate preventing conveyance of heat to the outside of the stamping block. Stamping block 9 is attached at fixed position on plate 13 through stamping support plate 58.

Further, at the position opposite from stamping block 9, stand 47 is provided, that receives the reactive force at the time of transfer. Stand 47 is, for example, supported through ball 49 such as an angle variation adjustment means between the stand and block 48, it is possible to change the angle of stand 47 to block 48. Further, in hot-stamping device 7, table 46 is provided that receives and supports document 2.

Note that the angle variation adjustment means don't limit ball 49. It may employ, for example, a gimbals plate spring and elastic members and the like.

Furthermore, in this embodiment, the angle variation adjustment means is provided in stand 47. It may be provided in stamping block 47.

Further, in hot-stamping device 7 of this embodiment, cassette 1 moves to come in contact with document 2 by means of first cam 27 drive. For example, hot-stamping device 7 of this embodiment is equipped with cassette-moving mechanism 14 that makes cassette 1 come in contact with document 2 at the time of hot-stamping with a load such that there is no shifting of this document 2, and in conjunction with this, it withdraws cassette 1 from document 2 after hot-stamping; cassette-movement mechanism 14 is actuated by first cam 27 drive. By this means, at the time of hot-stamping, cassette 1 holds document 2 in place, and prevents shifting while stamping. Further, when a carrier film supporting a holographic foil is peeled from document 2, floating of document 2 is prevented; satisfactory hot-stamping can be implemented.

Frame 10 in hot-stamping device 7 is provided with guide shaft 16 in the vertical direction. In this embodiment, cassette-moving mechanism 14 is constructed as follows to enable movement of cassette 1 in the direction of the shaft for guide shaft 16 through plate 11, 12 and 13.

Figure 8:
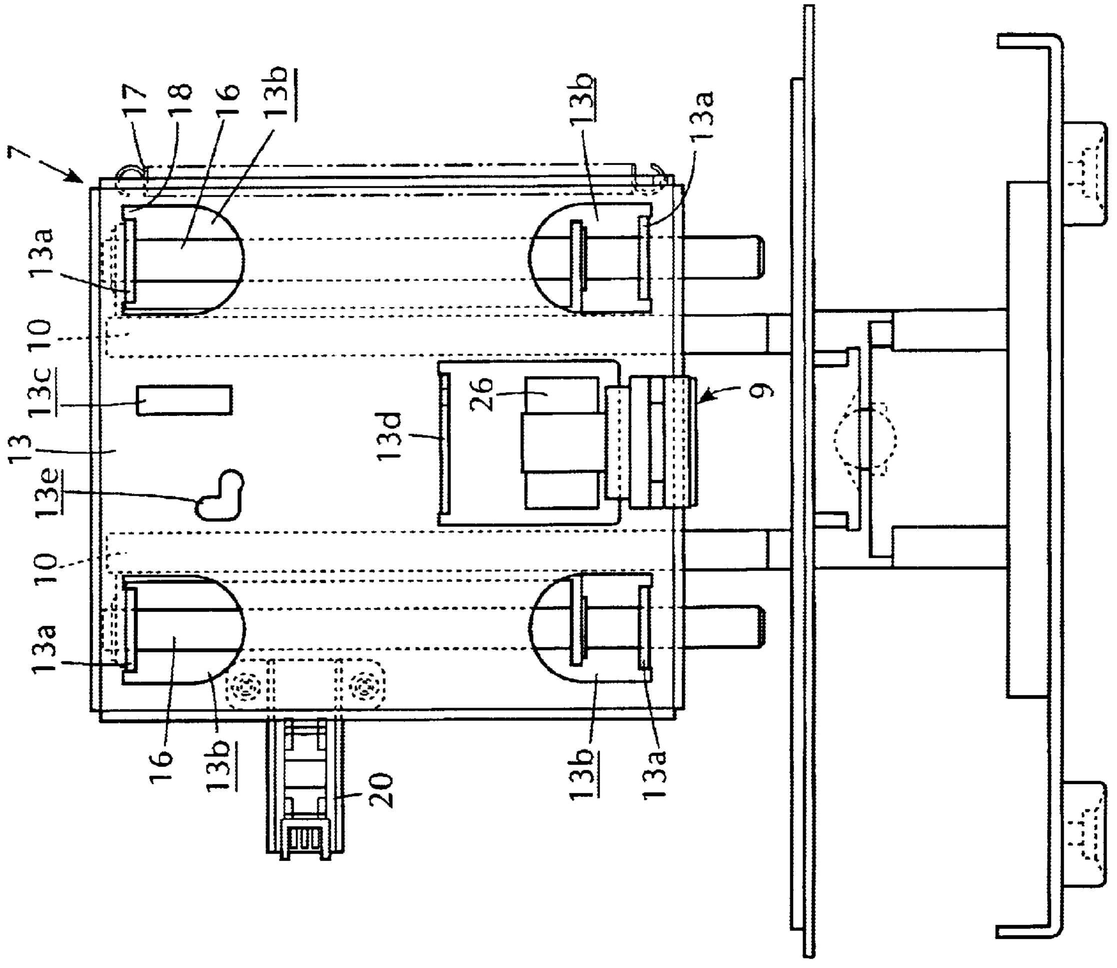
FIG. 8 is a simplified front view of a hot-stamping device, showing a mode of attachment of an innermost plate.
Figure 9:
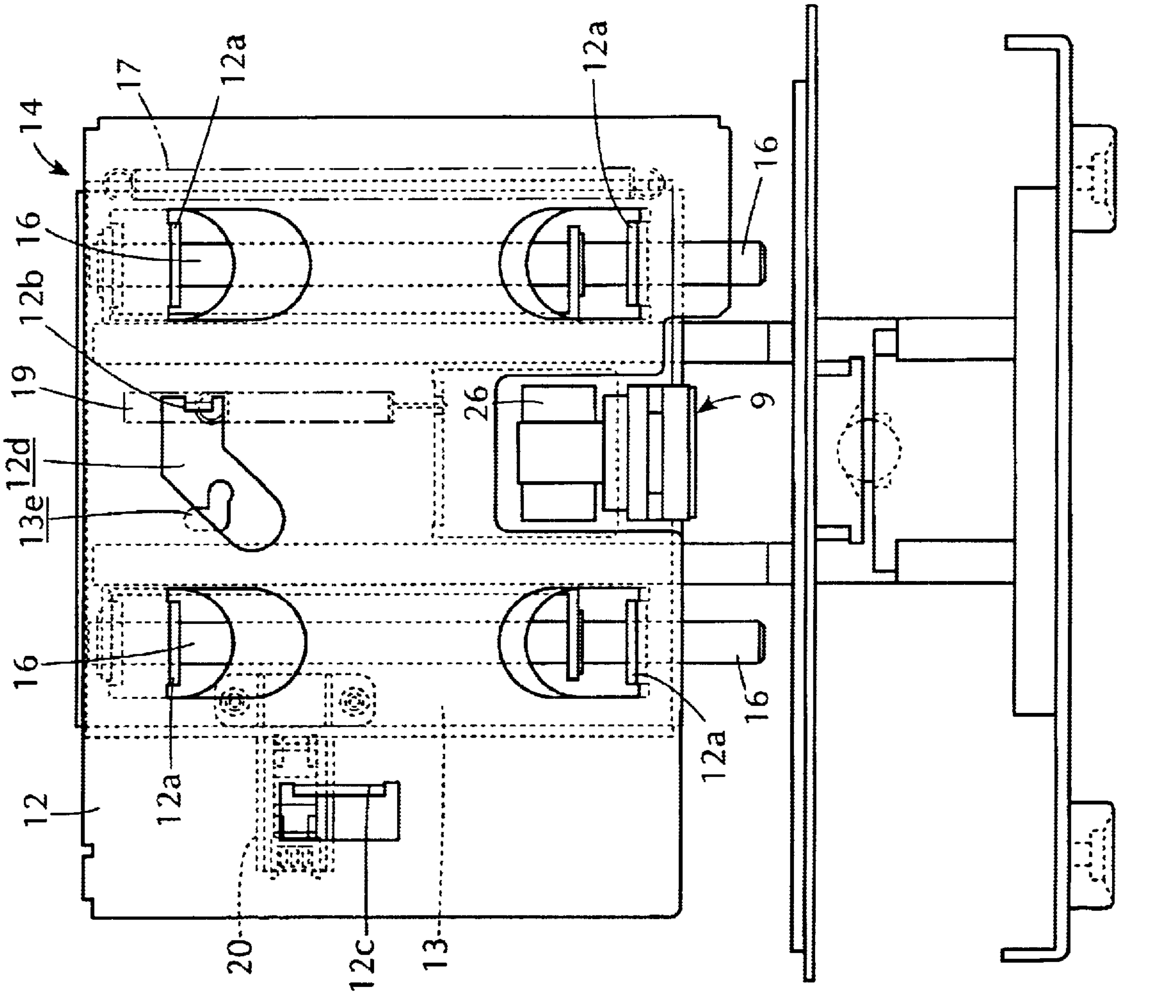
FIG. 9 is a simplified front view of a hot-stamping device, showing a mode of attachment of a middle plate.
Figure 10:
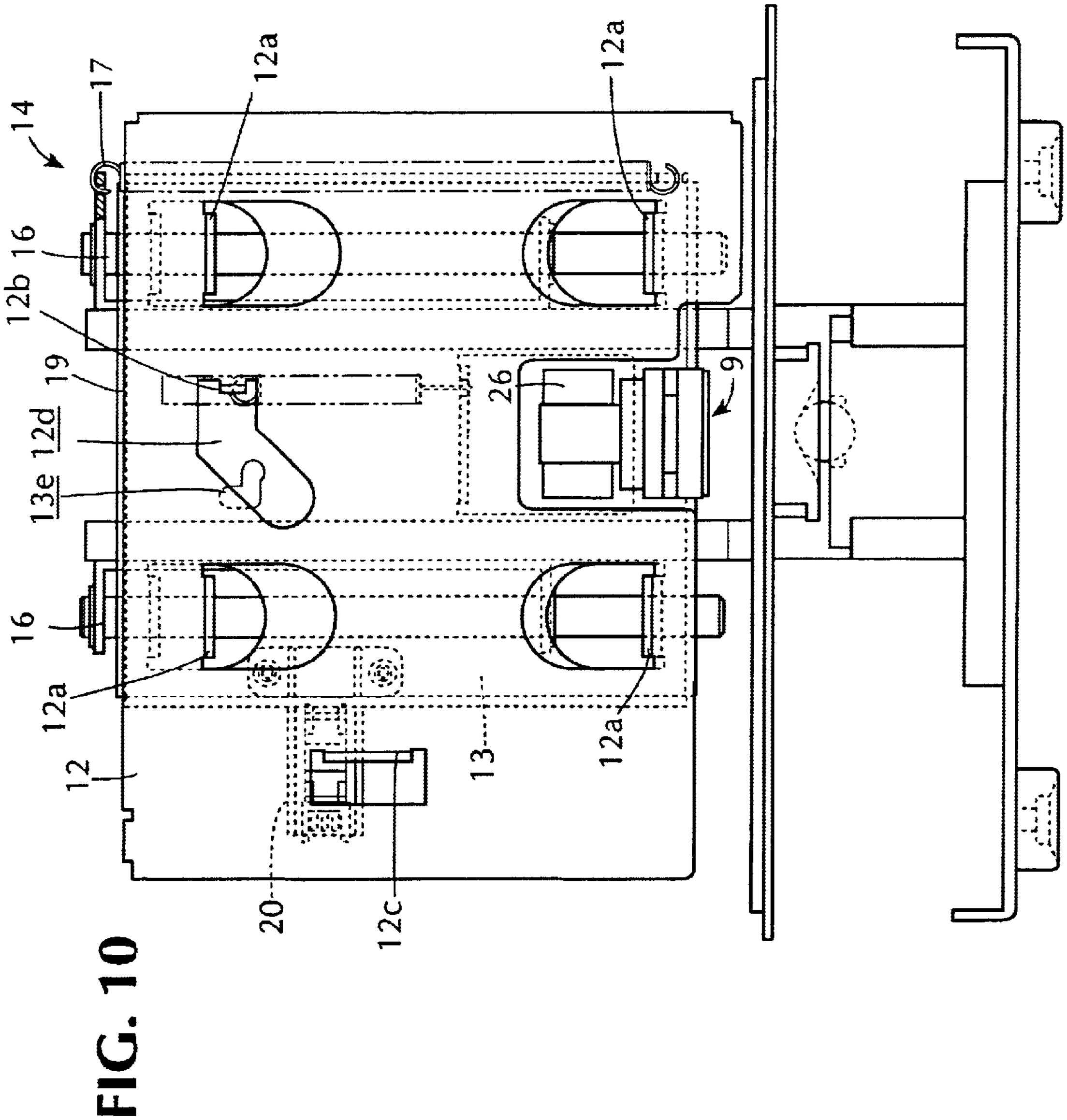
FIG. 10 is a simplified front view of a hot-stamping device, showing a mode of movement as a unit of a middle plate and an innermost plate.

Plate 13 is provided with flexing section 13*a* attached to guide shaft 16 so flexure is possible, attachment to guide shaft 16 is such that movement is possible (see FIG. 8). Further, plate 13, for example, by means of torsion coil spring 17 that adds force, comes in contact with stopper 18 provided on frame 10.

On plate 12 also, flexure section 12*a* is provided, attached to guide shaft 16 so flexure is possible. Plate 12 is attached to guide shaft 16 so movement is possible by passing through opening 13*b* in plate 13 and being in alignment with plate 13 (see FIG. 9). Further, plate 12 is connected to plate 13 through torsion coil spring 19, for example, that force. For example, catch 12*b* provided on plate 12 is inserted into opening 13*c* of plate 13, spring 19 is attached to catch 12*b* and catch 13*d* provided on plate 13. By this means, as plate 13 moves along guide shaft 16, plate 12 moves with it as a unit (see FIG. 9, FIG. 10). On the other hand, for example, when cassette 1 is in contact with document 2 to prevent movement of plate 12, plate 13 alone moves in opposition to the force exerted by spring 19, in other words, there is difference in movement between plate 12 and plate 13 (see FIG. 11).

Further, in this embodiment, photosensor 20 instantly detects the difference in movement between plate 12 and plate 13. For example, photosensor 20 is fixed on plate 13 and moves as a unit with plate 13. Further, shielding 12*c* is provided on plate 12 side to shield photosensor 20 at the instant there is a difference in movement between plate 12 and plate 13. Shielding 12*c* is provided, for example, by bending one part of plate 12. By detecting the instant that shielding 12*c* shields photosensor 20, the instant there is difference in movement between plate 12 and plate 13 is detected.

Plate 11 is attached to plate 12 so it moves as a unit with plate 12 in the shaft direction of guide shaft 16. Moreover, cassette 1 is supported on plate 11. In other words, cassette 1 is able to move in the shaft direction of guide shaft 16 through plate 11, 12 and 13.

Figure 5:
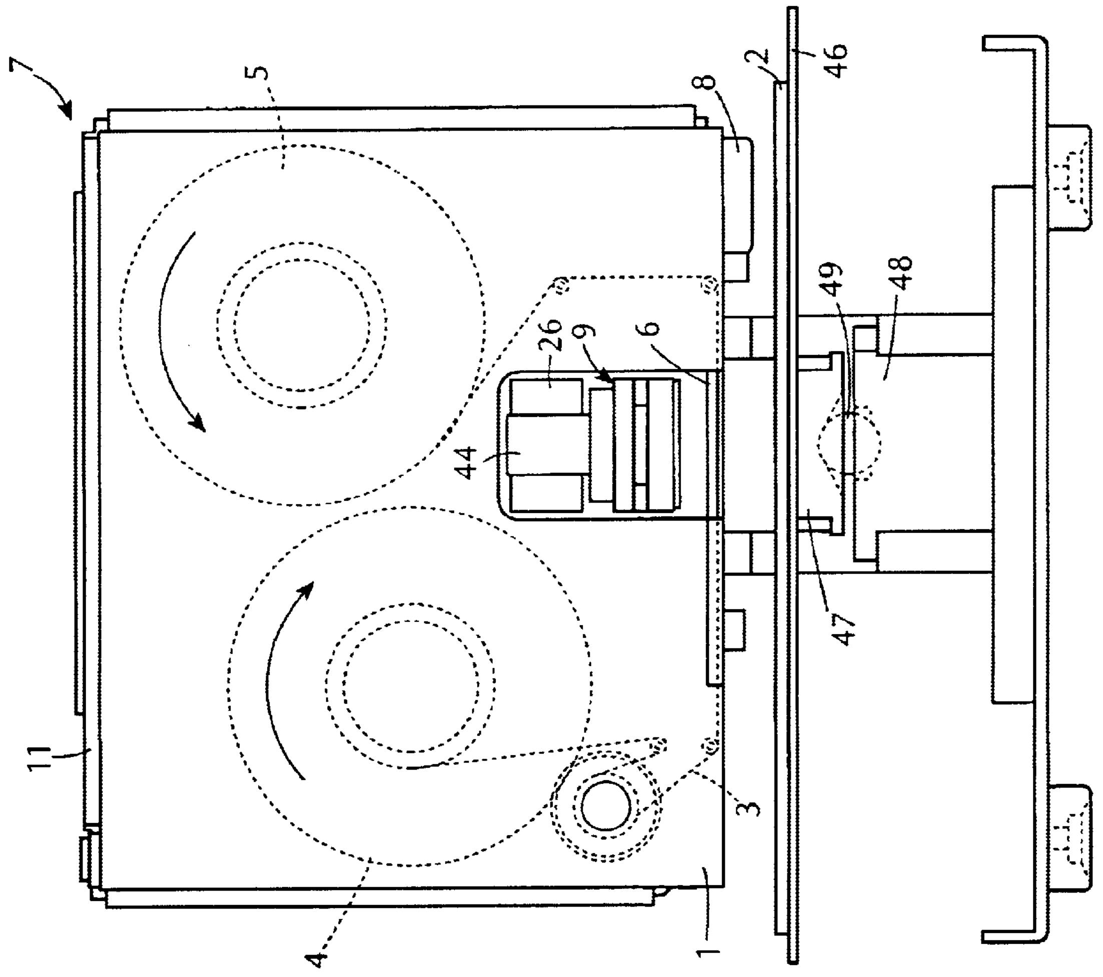
FIG. 5 is a simplified front view of said hot-stamping device, showing the readiness state.
Figure 6:
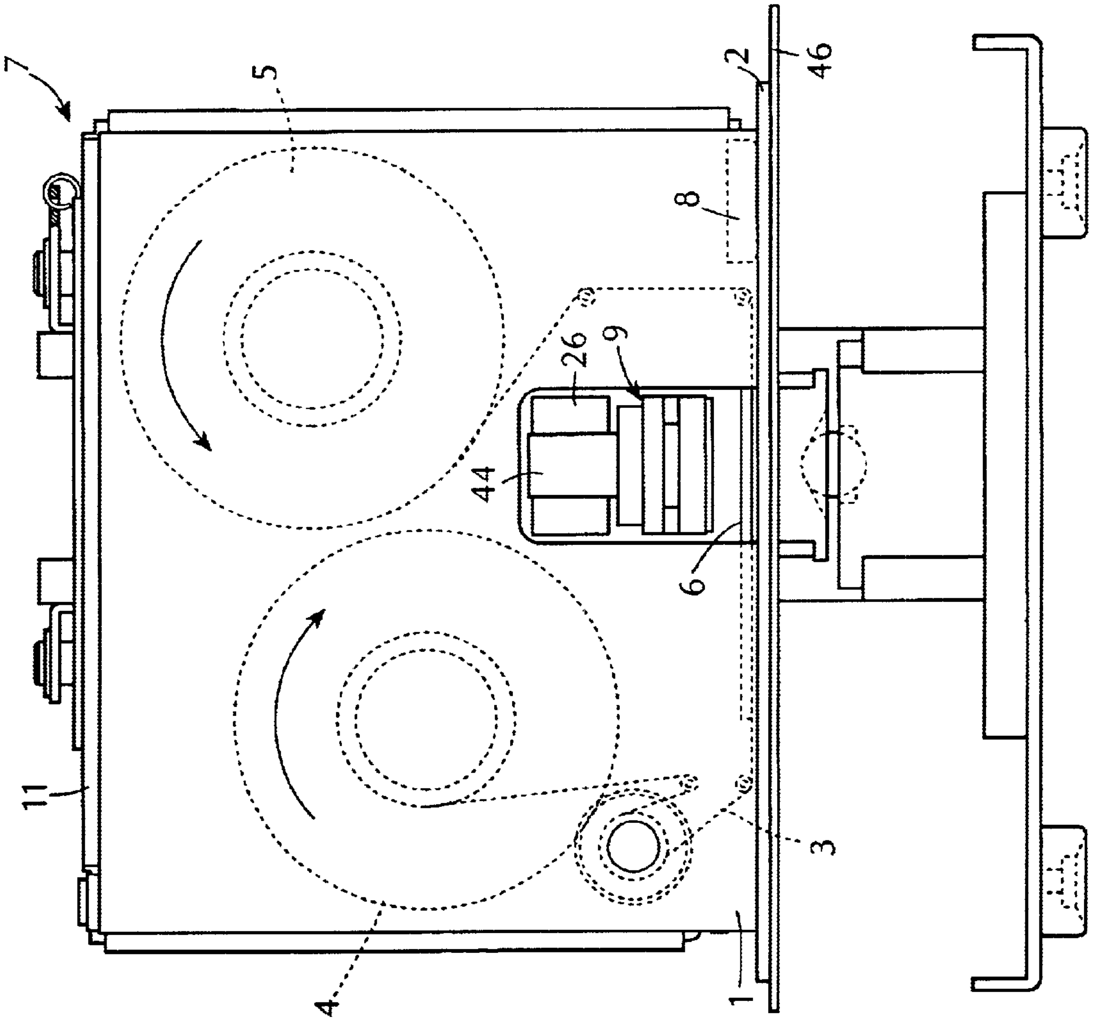
FIG. 6 is a simplified front view of said hot-stamping device, showing the state when a hot-stamping foil tape cassette comes in contact with a value-added medium.

In hot-stamping device 7, tape-winding mechanism not shown in the figure is provided, windup reel 4 is driven in the direction of the arrow in FIG. 5. When windup reel 4 is driven, the used part of hot-stamping foil tape 3 is wound, unused part is sent out to the face opposite to stamping section 9 in hot-stamping device 7. Further, although it is not shown in the figure, on the side of sendout reel 5, for example, torque limiter is provided so hot-stamping foil 3 is not supplied unless a tension exceeding braking force of the torque limiter is applied. On the other hand, on the side of windup reel 4, rotation of windup reel 4 is prevented through a reduction gear, for example, by maintenance torque (detente torque) on motor operating windup drive. By means of such construction, it is possible to prevent stretching and loosing of hot-stamping foil tape 3 at the time of peeling hot-stamping foil tape 3 after hot-stamping.

Further, on the bottom face of cassette 1 in this embodiment, damper 8 is provided, for example, that can move with load sufficient to hold document 2 in place. Clamper 8 protrudes from the bottom face of cassette 1, for example, when bottom face of cassette 1 comes in contact with document 2, it is inserted in cassette 1. For example, in this embodiment, the stroke movement possible for damper 8 is set to be 5 mm. Consequently, when the bottom face of cassette 1 is at position within 5 mm of document 2, damper 8 moves first and exerts force on document 2 to hold it in place.

Further, cassette 1 of this embodiment, for example, has shutter 6 to protect hot-stamping foil tape 3 at times other than at a time of hot-stamping transfer. Furthermore, shutter 6 is utilized to peel hot-stamping foil tape 3 from document 2. Shutter 6, for example, is built into the bottom face of cassette 1 so that a sliding motion is possible. Shutter 6 is formed in the shape of sideways "U", for example, to protect from both front and back faces, the part of hot-stamping foil tape 3 that is exposed from the cassette case.

Figure 7:
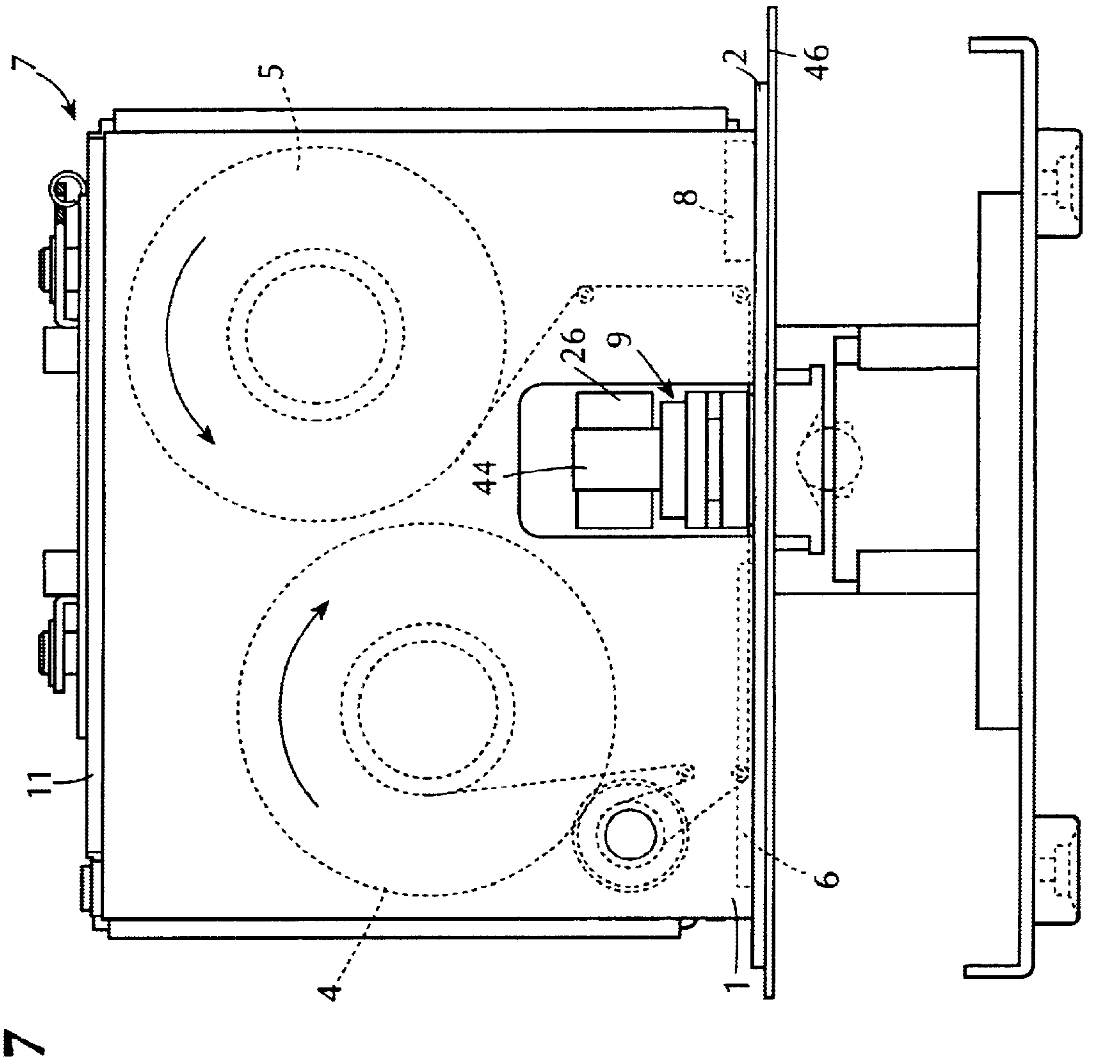
FIG. 7 is a simplified front view of said hot-stamping device, showing the state when a stamping section comes in contact with a value-added medium through a hot-stamping foil tape.
Figure 16:
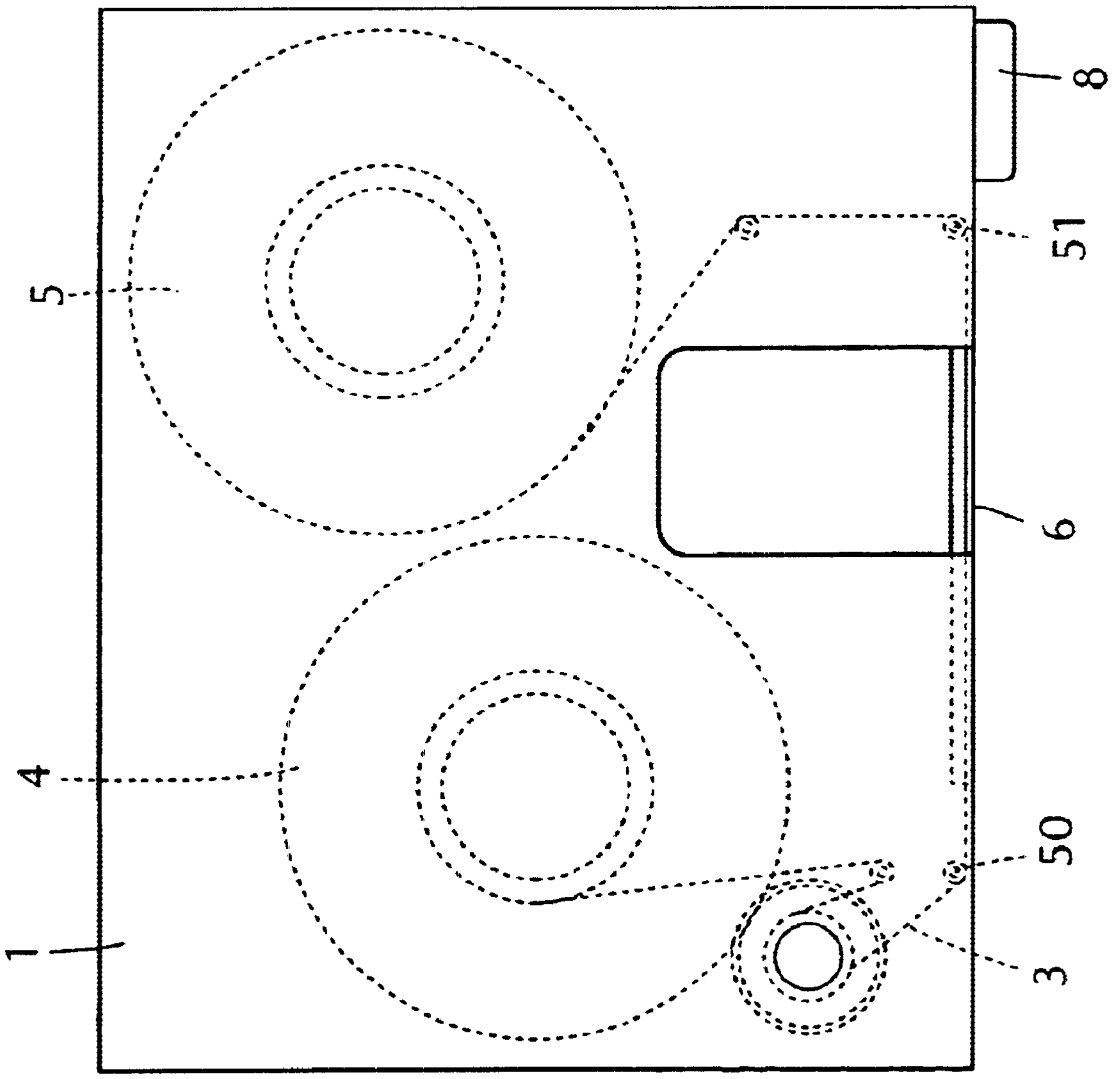
FIG. 16 is a simplified front view showing one example of a cassette.

When cassette 1 is mounted on hot-stamping device 7 as shown in FIG. 5, shutter 6 is positioned on the face opposite stamping section 9. Opening and closing of shutter 6 is, for example, linked to hot-stamping action in hot-stamping device 7. In other words, as shown in FIG. 7, at the time of hot-stamping transfer, shutter 6 is withdrawn from the face opposite stamping section 9 to expose hot-stamping foil tape 3 on the face opposite stamping section 9. Then, upon completion of hot-stamping, shutter 6 returns to initial position to resume protection of hot-stamping foil tape 3. At this time of return, hot-stamping foil tape 3 is peeled from document 2 by means of shutter 6. Moreover, in this embodiment, as shown in FIG. 16, for example, guide roller 50 on the withdrawal side of shutter 6 is positioned by means of guide roller 51 to be somewhat above document 2 in the figure, hot-stamping foil tape 3 is positioned at an angle to document 2 so peeling of the carrier film by shutter 6 can be effected in satisfactory fashion.

In hot-stamping device 7 of this embodiment, so that shutter 6 can be opened and closed by the action of cassette-moving mechanism 14, for example, foil-peeling mechanism 15 that peels hot-stamping foil tape 3 from document 2 is constructed as follows from cassette 1 equipped with shutter 6 and cassette-moving mechanism 14.

Figure 12:
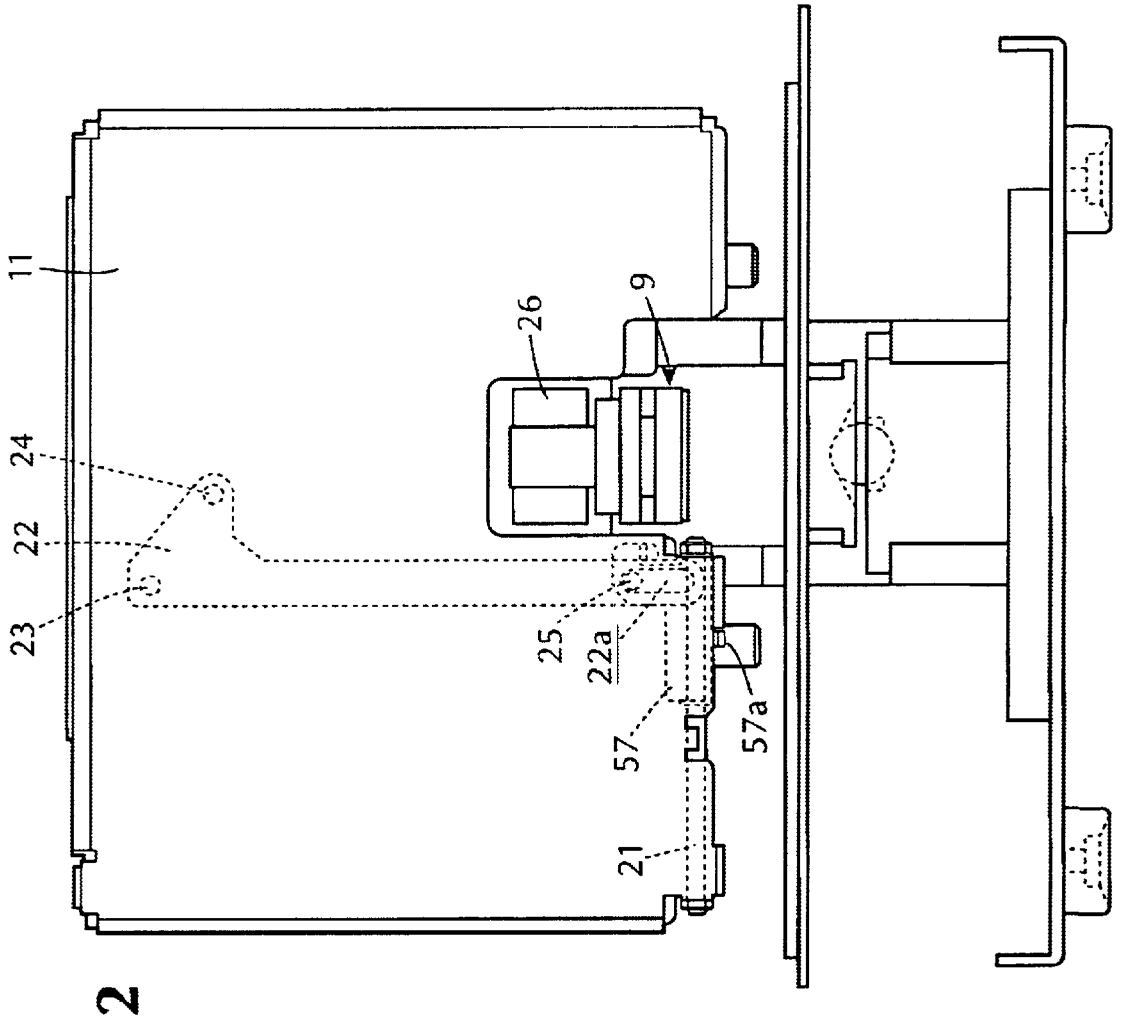
FIG. 12 is a simplified front view of hot-stamping device, showing one example of construction of a connection section connecting to a shutter provided on cassette movement mechanism.

Slide shaft 21 is fixed on the back side of cassette 1 mounting face in plate 11, connection part 57 (slide plate) is built in so that horizontal movement is possible with slide shaft 21 as a guide (see FIG. 12). Slide plate 57 has protrusion 57*a*, when cassette 1 is mounted on plate 11, protrusion 57*a* and shutter 6 make connection.

Further, on the back side of cassette 1 mounting face in plate 11, lever 22 is attached so that rotation is possible with shaft 23 as a center (see FIG. 12). On lever 22, pin 24 is attached to make connection with L-shaped groove 13*e* formed on plate 13. By this means, lever 22 rotates with shaft 23 as a center through connection pin 24, by the relative motion downwards in the figure of plate 13 to plate 11 (see FIG. 13 to FIG. 15). Moreover, cut section 12*d* is present in plate 12 so that there is no interference to movement of connection pin 24. Further, long hole 22*a* is present in lever 22, ridged pin 25 attached to slide plate 57 makes connection with long hole 22*a*. By this means, rotation of lever 22 and movement of slide plate 57 are linked through ridged pin 25.

Figure 13:
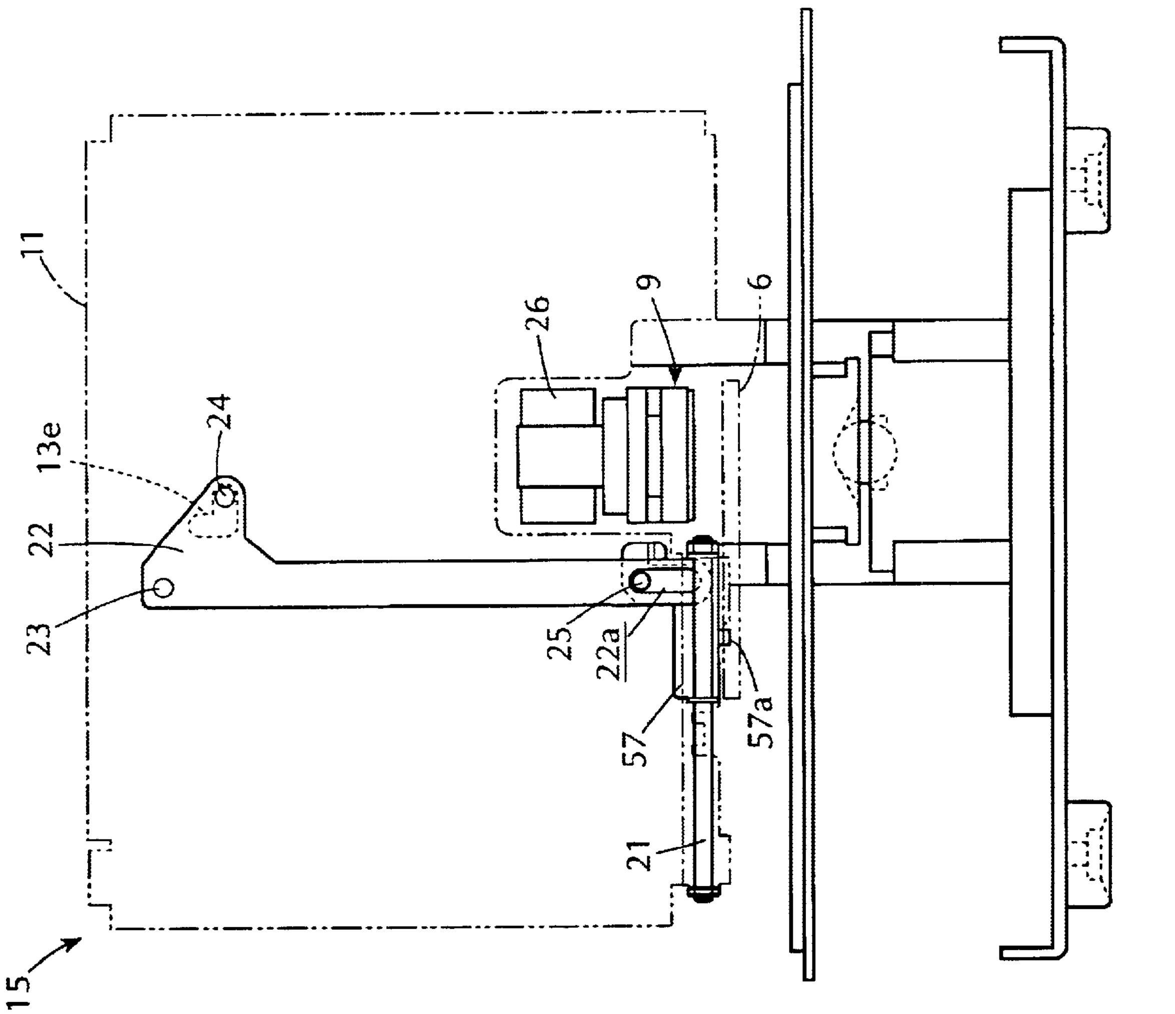
FIG. 13 is a simplified front view showing a hot-stamping device in a readiness state and a foil-peeling mechanism.
Figure 14:
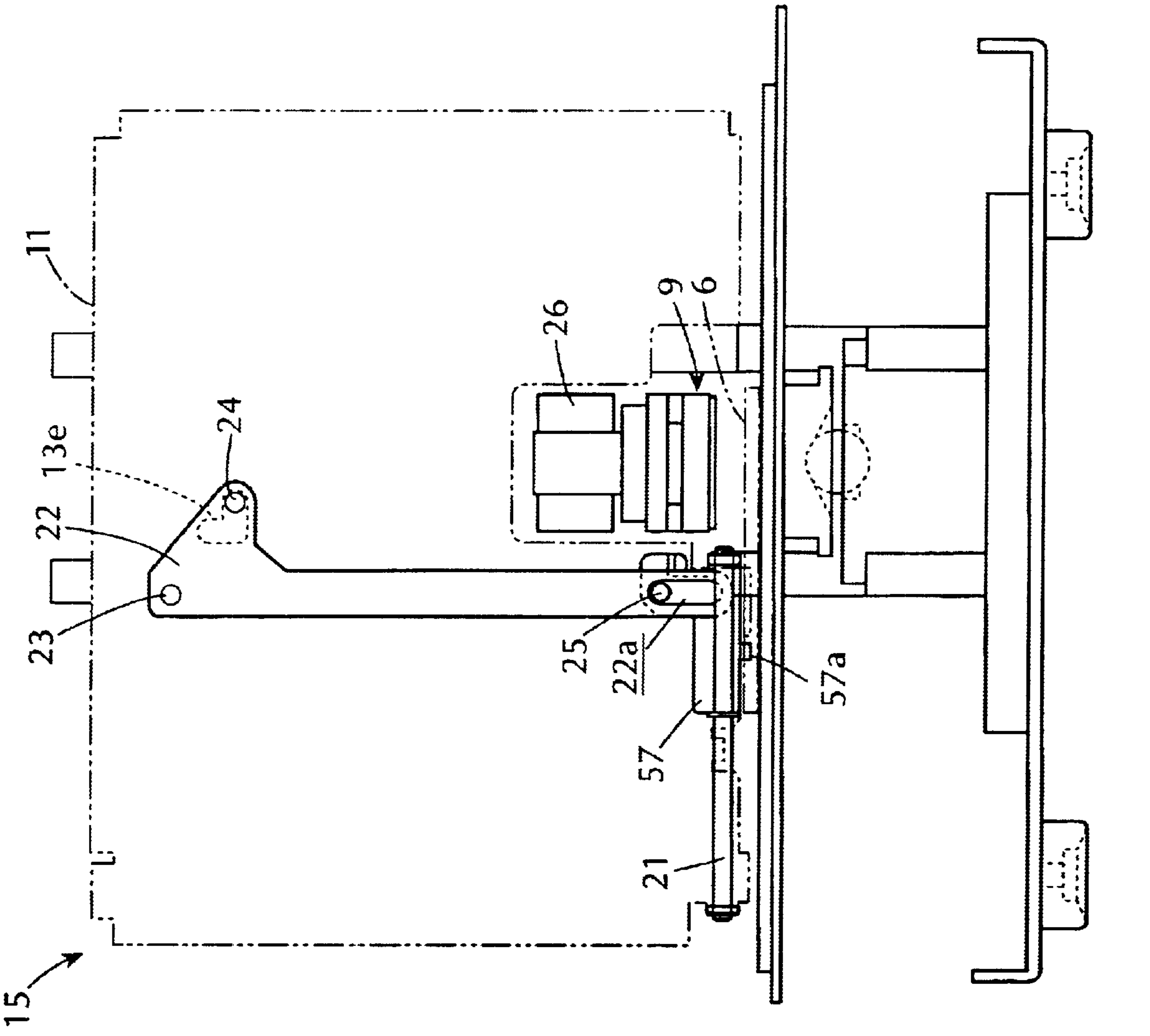
FIG. 14 is a simplified front view explaining an action of a foil-peeling mechanism, showing the state when a cassette from the state in FIG. 13 comes in contact with a value-added medium.
Figure 15:
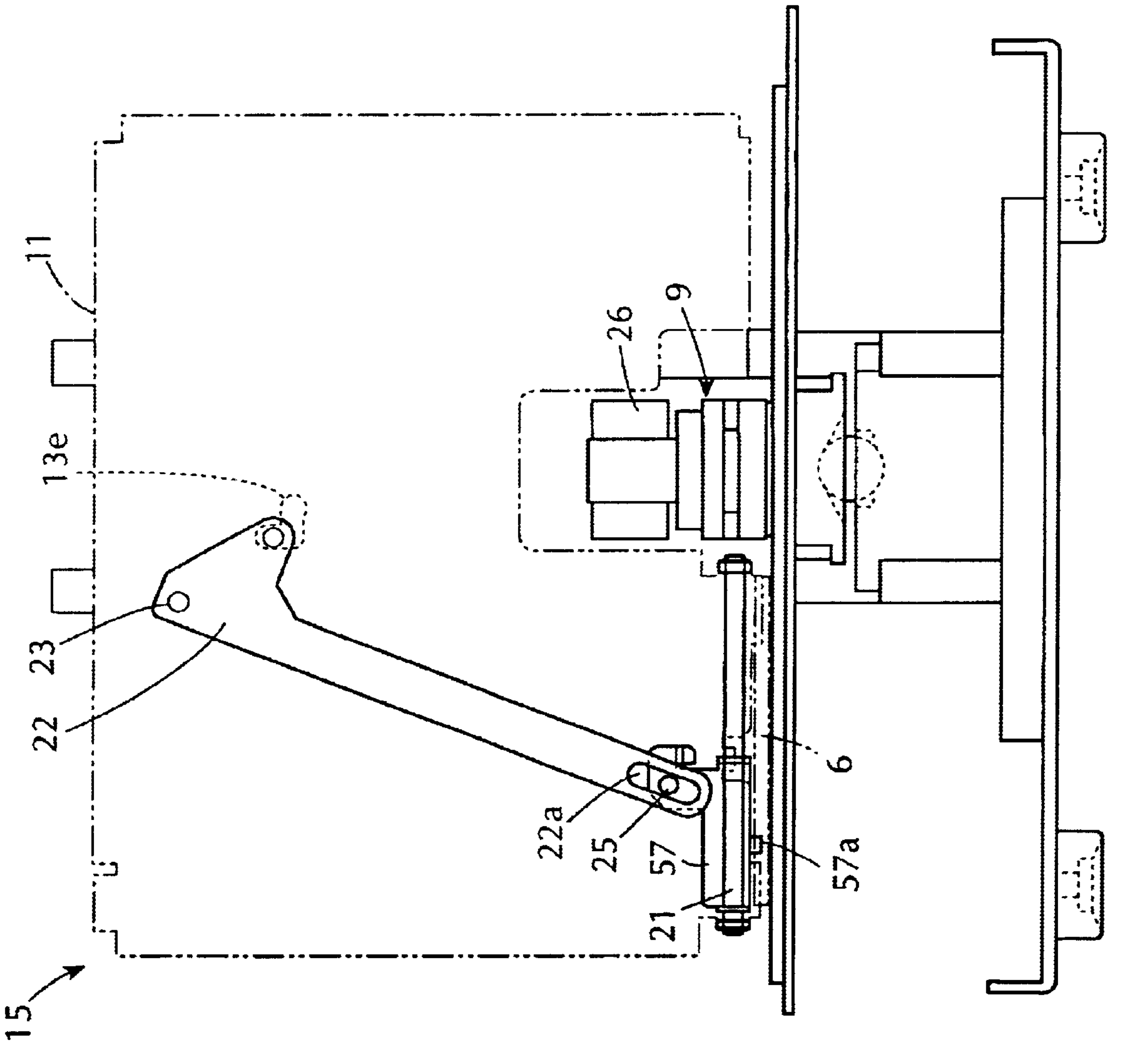
FIG. 15 is a simplified front view explaining an action of a foil-peeling mechanism, showing the state when a stamping section from the state in FIG. 14 comes in contact with a value-added medium through a hot-stamping foil tape.

Next, one example of the action of hot-stamping device 7 constructed as above is explained. FIG. 1, FIG. 5, and FIG. 13 show device 7 in a readiness state. Further, plate 12, 13 are in the state shown in FIG. 9. In the readiness state, plate 13 as shown in FIG. 8, is in contact with stopper 18 by the force exerted by spring 17. Plate 12 connected with plate 13 and spring 19, plate 11 attached to plate 12 as a unit in the vertical direction, cassette 1 supported on plate 11, are respectively in withdrawal position above the figure, from document 2 on table 46. Further, stamping block 9 fixed on plate 13 through stamping support plate 58 is also in withdrawal position above the figure from document 2. Further, in the readiness state, there is a fixed space provided between hot-stamping foil tape 3 and stamping block 9, to prevent damage to hot-stamping foil tape 3 from the heat of stamping block 9 before hot-stamping.

In the readiness state, stamping block 9 is preheated to about 70~80° C., for example. By preheating to temperature in this range, it is possible to heat several seconds to temperature where hot-stamping is possible, for example, about 100° C., hot-stamping can be effected expeditiously. Further, preheating is not essential, there is no need for preheating in situations where prevention of power consumption is a priority.

Further, in the readiness state, stamping arm 26 is positioned between stamping block 9 and insertion block 44 so that there is 0.5 mm space, for example (see FIG. 17(A)). By this means, heat of stamping block 9 does not escape to the side of stamping arm 26, energy consumption is suppressed.

When document 2 is placed on table 46, and a hot-stamping command is given, first cam 27 rotates clockwise in FIG. 1, by stepper motor 37 drive. Following the ring perimeter shape of first cam 27, cam follower 31 moves as it opposes the force exerted by spring 35 and spring 36. By this means, as bearing 33 moves downwards in the figure along long hole 34, stamping arm 26 rotates with the contact point of second cam 29 and cam follower 32 as a fulcrum of rotation. Shortly thereafter, insertion block 44 comes in contact with the top face of stamping block 9. By this, hot-stamping device 7 is in the state shown in FIG. 2 and FIG. 17(B).

Further, when first cam 27 rotates and stamping arm 26 rotates, insertion block 44 inserts stamping block 9 downwards toward document 2. Stamping support plate 58 supporting stamping block 9 is fixed on plate 13, plate 13 is pushed downwards along guide shaft 16 as it opposes the force exerted by spring 17. Plate 12 is connected with plate 13 and spring 19, plate 11 is attached to plate 12 as a unit in the vertical direction, and cassette 1 supported on plate 11 also move downwards together with plate 13. Cassette 1 moves downwards toward document 2, initially, damper 8 comes in contact with document 2. In a short time, the entire bottom face of cassette 1 comes in contact with document 2 by means of load sufficient to prevent shifting of document 2. By this means, hot-stamping device 7 is in the state shown in FIG. 3, FIG. 6 and FIG. 14. Further, at this point, plate 12, 13 are in state shown in FIG. 10.

Furthermore, as first cam 27 rotates, and stamping arm 26 rotates, insertion block 44 inserts stamping block 9 further downwards. Here, after entire bottom face of cassette 1 comes in contact with document 2, cassette 1, plate 11, plate 12 cannot move downwards. However, plate 13 can move further down as it opposes the force exerted by spring 19 (see FIG. 11).

When plate 11 and plate 12 stop, and only plate 13 moves downwards, connection pin 24 moves L-shaped groove 13$e$, lever 22 rotates clockwise with shaft 23 as center. Accompanying rotation of lever 22, slide plate 57 slides to the left in FIG. 14, and withdraws shutter 6 linked to slide plate 57 from the face opposite stamping block 9 (see FIG. 15). In other words, shutter 6 that shielded hot-stamping foil tape 3 is in an open state.

On the other hand, the instant there is difference in movement between plate 13 and plate 12, in other words, the instant that bottom front face of cassette 1 comes in contact with document 2, the movement is detected by photosensor 20. Here, the distance between stamping block 9 and bottom face of cassette 1 before this detection by photosensor 20 is identical to the distance in the readiness state and is known already because plate 11, 12, 13 move as a unit. Therefore, first cam 27 is rotated only to the required amount by managing the pulse count of stepper motor 37, so a stamping block 9 is moved only the distance between stamping block 9 and bottom face of cassette 1 at the time of detection by photosensor 20.

Figure 11:
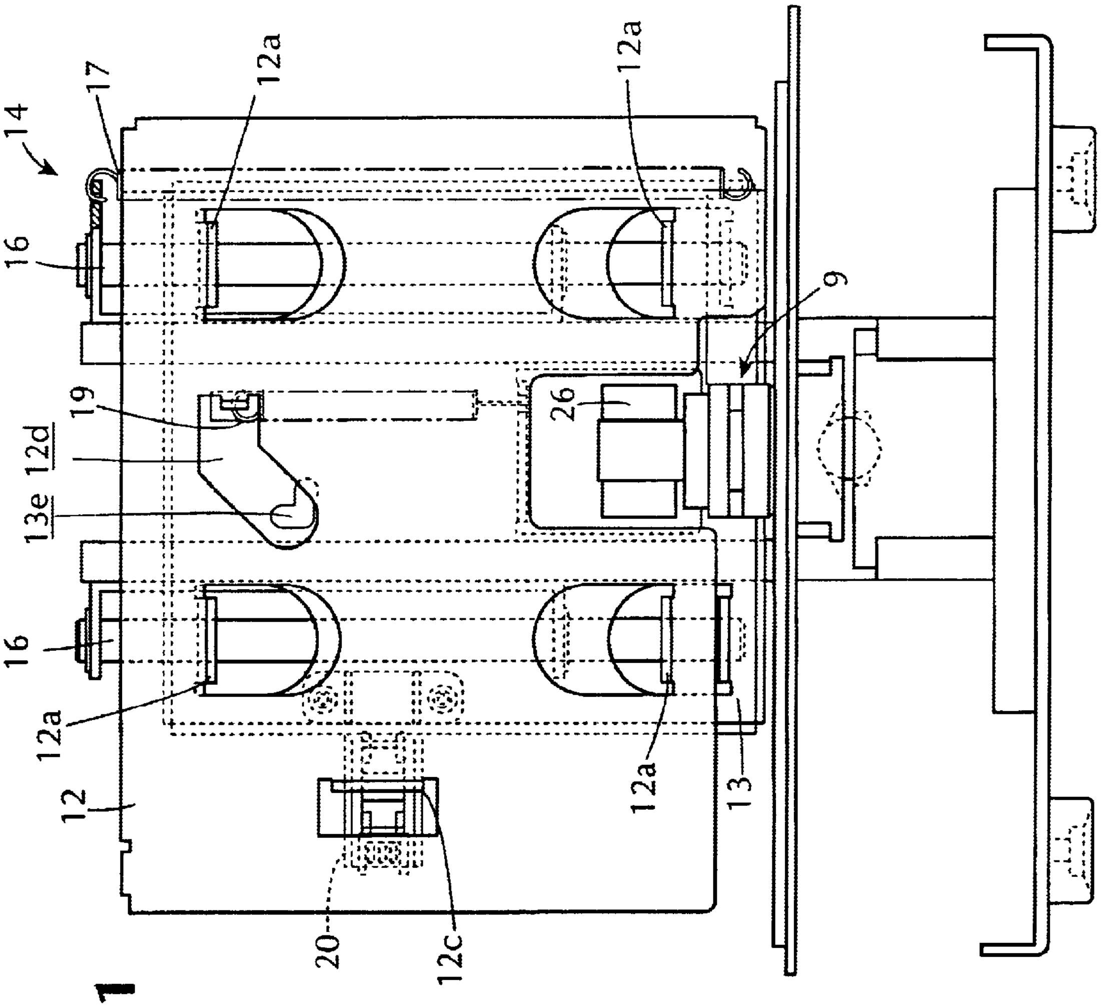
FIG. 11 is a simplified front view of a hot-stamping device, showing a mode when an innermost plate moves differently from a middle plate.

When the shutter 6 opens, the bottom face of stamping block 9 comes in contact with hot-stamping foil tape 3, further, through hot-stamping foil tape 3, stamping block 9 comes in contact with the top face of document 2 on which hot-stamping is to be implemented. By this means, the state becomes that shown in FIG. 4, FIG. 7 and FIG. 15. Furthermore, at this time, the state of plate 12, 13 is shown in FIG. 11. Stepper motor 37 stops in this state, first cam 27 also stops and keeps its position. Moreover, because change in radius per angle of rotation for first cam 27 was designed to be large, movement of stamping arm 26 from readiness state to this point can be effected quickly.

Next, DC motor 39 is driven and second cam 29 is rotated clockwise in FIG. 7. At this time, contact point between first cam 27 and cam follower 31 becomes the fulcrum of rotation, cam follower 32 moves according to the contour shape of second cam 29, as it opposes the force exerted by spring 35 and spring 36 (second cam 29 attains state shown by two-dot chain line in FIG. 4). By this means, stamping arm 26 rotates, and exerts pressure on document 2 through hot-stamping foil tape 3. In other words, holographic foil is hot-stamped on document 2. Moreover, because change in radius per angle of rotation for second cam 29 was designed to be small, a large load can be brought to bear on stamping arm 26.

At this point, holographic foil is fused on document 2 by hot-stamping, a transparent carrier film supporting holographic foil is also in the fused state on document 2 through fused holographic foil. To complete the hot-stamping process, this carrier film must be peeled off. In this embodiment, a carrier film is peeled off by utilizing the closing motion of shutter 6 back to the position in readiness state.

Figure 4:
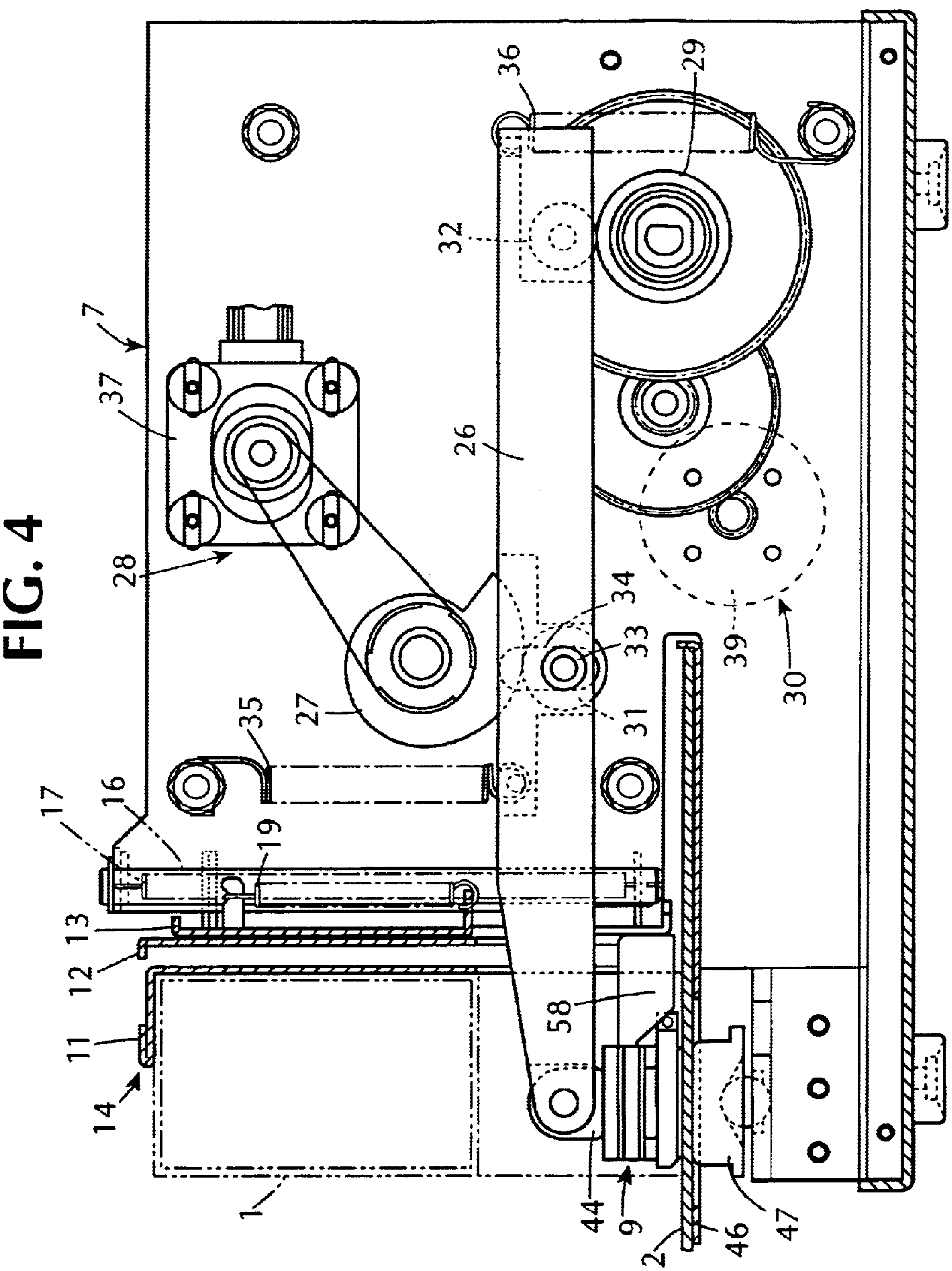
FIG. 4 is a simplified cross-sectional view of said hot-stamping device, showing the state when stamping section from the readiness state in FIG. 3 comes in contact with a value-added medium through hot-stamping foil tape.

After hot-stamping, first cam 27 rotates counterclockwise in FIG. 4 to return stamping arm 26 to a readiness position. Following rotation of first cam 27, the added force of spring 17 is released, plate 13 and stamping block 9 move upward, plate 12, plate 11, and cassette 1 also move upward to separate from document 2. At the same time, the added force of spring 19 is released, lever 22 rotates counterclockwise in FIG. 15 with shaft 23 as center to close shutter 6. In other words, shutter 6 begins to close from the time bottom face of cassette 1 separates from document 2. At this point, the front edge of shutter 6 has entered the space between carrier film and document 2, as shutter 6 closes, shutter 6 is inserted between carrier film and document 2, and effects peeling between document 2 and carrier film. Further, at the time peeling is effected by this shutter 6, upward movement of cassette 1 continues, therefore, carrier film is in the state of being pulled toward the top, reliable peeling by shutter 6 occurs.

Second cam 29 rotates to a readiness position, and first ram 27 rotates to its position in a readiness state. In this case, second cam 29 does not rotate in a reverse direction, but only rotates forward (clockwise rotation in FIG. 4) to return to the readiness position. By this, hot-stamping process is completed, there is a return to the readiness state shown in FIG. 1, FIG. 5 and FIG. 13.

As described above, according to hot-stamping device 7 of this invention, stamping section 9 is quickly moved to close proximity of document 2 by first cam 27, required pressure-exerting load for hot-stamping can be generated by second cam 29. In other words, by differentiating use between high-speed first cam 27 used to move stamping section 9 and high-load second cam 29 used to exert pressure on stamping section 9, sufficient stamping load is obtained without using a large-size cam structure or a large-size motor, and at the same time, in comparison to the conventional hot-stamping device that has only a single high-load drive section, high-speed hot-stamping becomes possible. Moreover, without increasing rigidity of the entire device as in the prior art, it is sufficient to ensure sectional rigidity in response to second cam 29. Consequently, simplification, smaller size, and lower cost for hot-stamping device 7 are realized.

Further, by changing or adjusting shape, amount of rotation, rotation speed, etc. of first cam 27 and second cam 29, adjustment of desired hot-stamping load is effected readily. Therefore, it is possible to provide a hot-stamping device that is small in size but has extremely high utility.

Further, because hot-stamping foil is in cassette form as hot-stamping foil tape 3, it is very easy to perform exchange actions for a hot-stamping foil.

Furthermore, because cassette 1 is moved to the document 2 side and comes in contact with document 2 by means of first cam 27 drive, document 2 is fixed in position, so shifting of hot-stamping can be prevented. Further, at the time carrier film supporting holographic foil is peeled from document 2, floating of document 2 is prevented, satisfactory hot-stamping can be implemented.

Further, the position where cassette 1 comes in contact with document 2 is the hot-stamping base position, stamping section 9 is moved to this base position by first cam 27 drive, at this base position, pressure-exerting load is brought to bear on stamping section 9 by second cam 29 drive, therefore, even when thickness of document 2 ranges from a single sheet to a brochure, for example, it is possible to continually bring constant pressure-exerting load to bear at a level with no problems from a practical standpoint, uniform and moreover, satisfactory hot-stamping becomes possible regardless of kind of document 2.

Furthermore, the above-described embodiment is an optimal example or best made embodiment of this invention, but there are no limitations thereby, various embodiments in different forms are possible as long as there is no deviation from the gist of this invention.

For example, the fulcrum of rotation of stamping arm 26 and the lever ratio of stamping arm 26 according to the position of first cam 27 and second cam 29 are not limited to those shown in the embodiment described above. It is possible to perform appropriate adjustments according to the required hot-stamping load and hot-stamping speed.

Further, for example in the embodiment described above, when first cam 27 is driven, the contact point between second cam 29 and stamping arm 26 (cam follower 32) becomes the fulcrum of rotation for stamping arm 26, on the other hand, when second cam 29 is driven, the contact point between first cam 27 and stamping arm 26 (cam follower 31) becomes the fulcrum of rotation for stamping arm 26, but there are no limitations imposed thereby. For example, after first cam 27 is driven, when second cam 29 is driven, the shaft acting as a fulcrum for rotation of stamping arm 26 can be connected separately to stamping arm 26, first cam 27 is withdrawn from stamping arm 26, stamping arm 26 can be rotated by second cam 29 drive, with this shaft newly connected to stamping arm 26 being the center for fulcrum of rotation. Further, the timing for driving first cam 27 and second cam 29 is not limited to the embodiment in the embodiment described above. Depending on the situation, it is also possible to drive second cam 29 while first cam 27 is driven, to rotate stamping arm 26.

Further, in the embodiment described above, cassette 1 moves to come in contact with value-added medium 2, but the hot-stamping device of this invention is not limited thereby. Any hot-stamping device is possible as long as it has first cam 27 in contact with stamping arm 26 that moves stamping section 9 to close proximity of value-added medium 2, and first drive section 28 driving first cam 27, and second cam 29 that brings pressure-exerting load to bear on stamping section 9 that was moved to close proximity of value-added medium 2, and second drive section 30 driving second cam 29.

Figure 18:
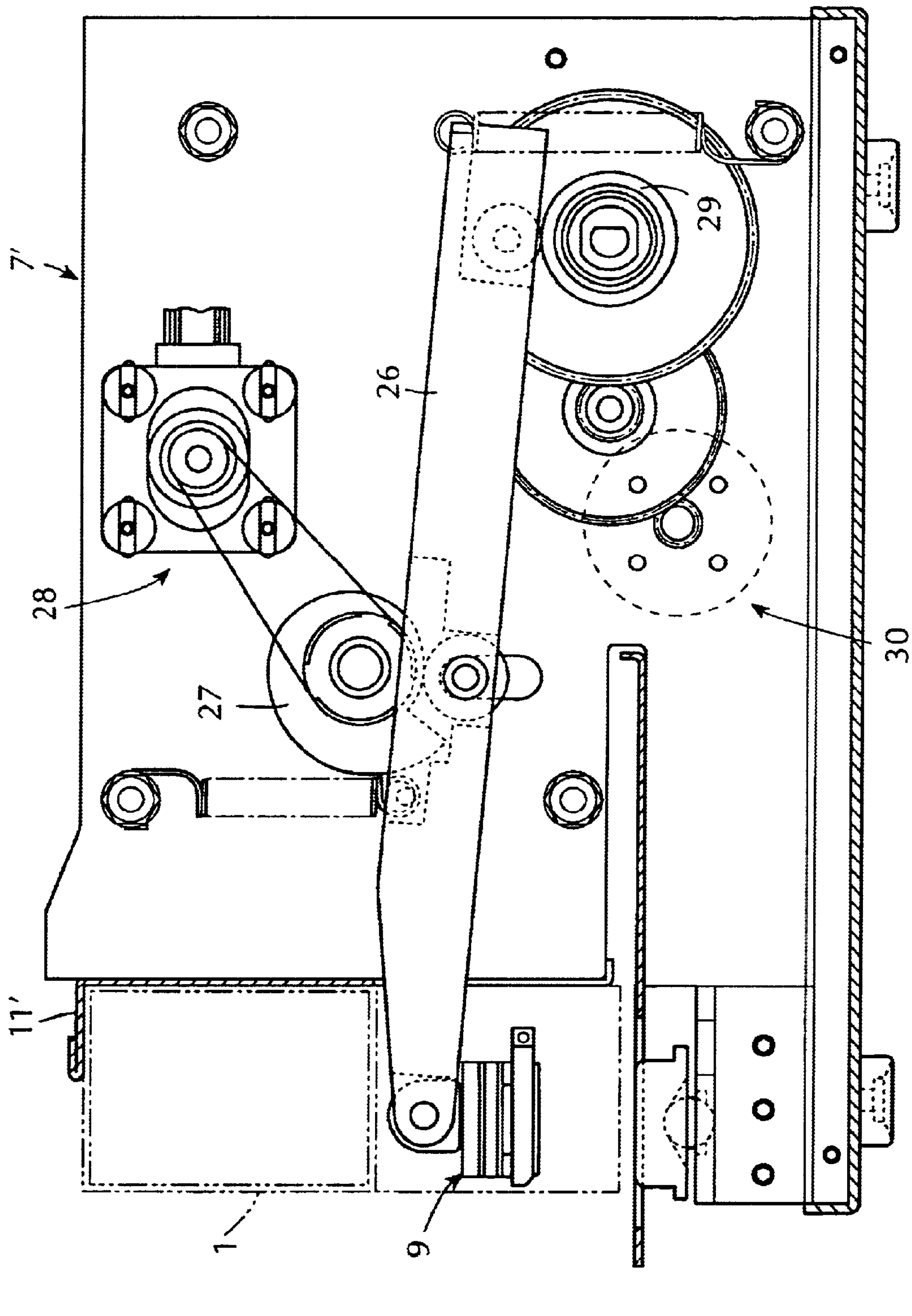
FIG. 18 is simplified cross-sectional view showing another embodiment of a hot-stamping device of this invention, and shows a hot-stamping device in a readiness state.
Figure 19:
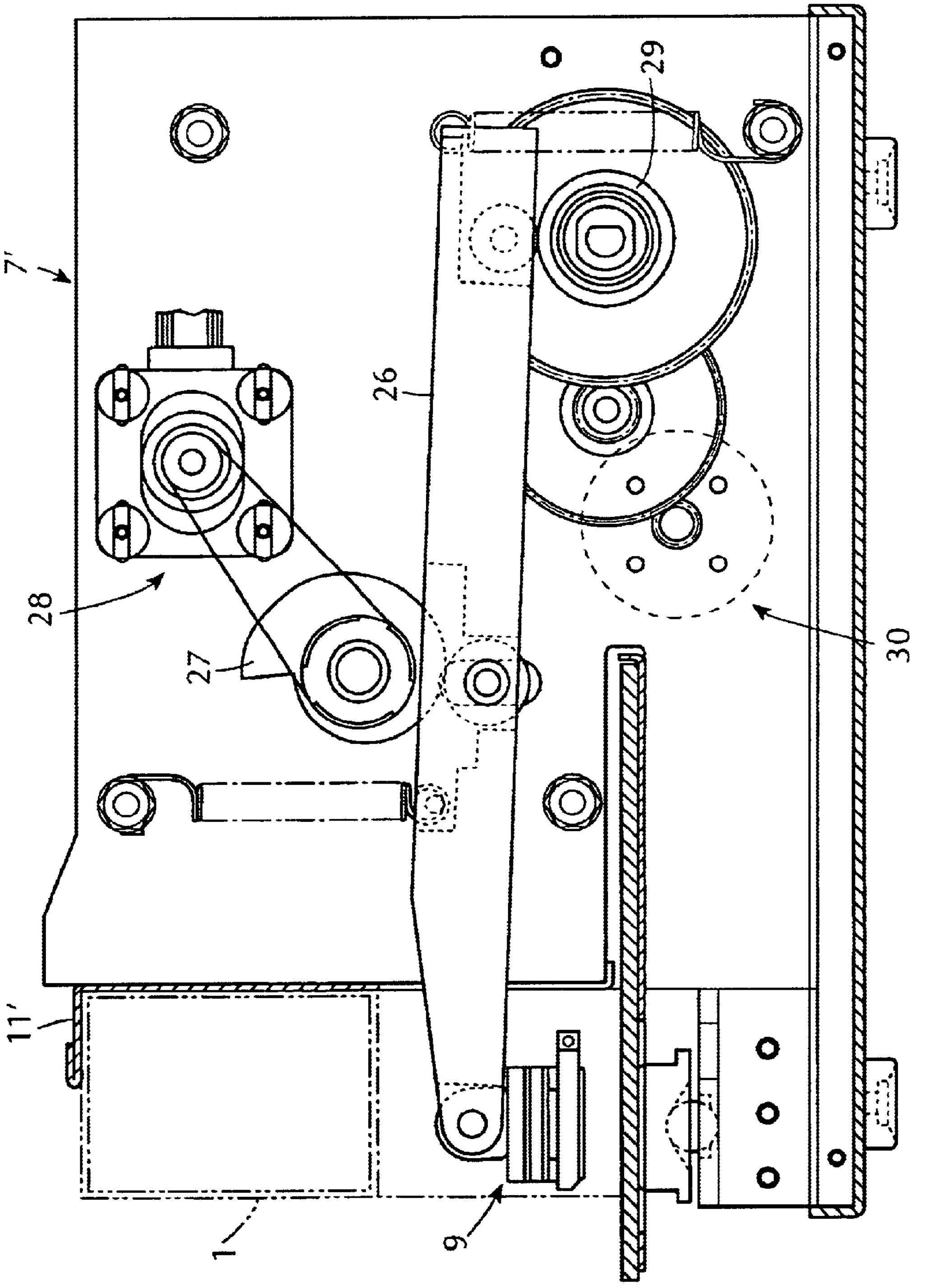
FIG. 19 is a simplified cross-sectional view of a hot-stamping device of another embodiment, and shows the state at the time of hot-stamping action.
Figure 20:
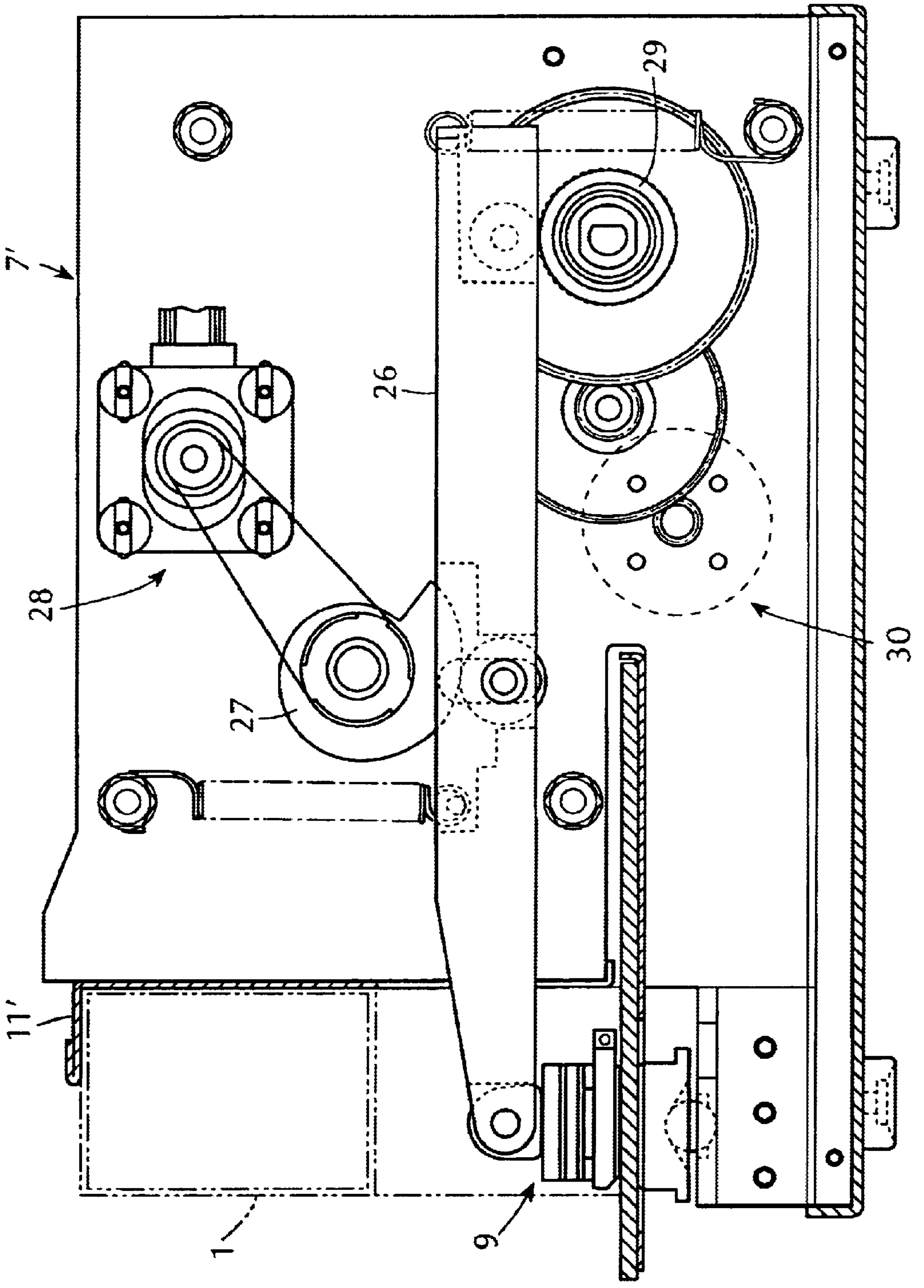
FIG. 20 is a simplified cross-sectional view of a hot-stamping device of another embodiment shown in FIG. 18, and shows a state at a time of hot-stamping transfer.

For example, as in hot-stamping device 7' shown in FIG. 18 to FIG. 20, structure can be such that plate 11' supporting cassette 1 is attached in fixed position on frame 10. Moreover, in this case, stamping section 9 is attached to stamping arm 26. In this case, the advantage of having movable cassette 1 as explained in embodiment described above is lost, however, it becomes possible to construct a very simple hot-stamping device.

Further, in the embodiment described above, construction is such that cassette 1 and shutter 6 are activated by utilizing the amount of movement of stamping arm 26 by first cam 27, hot-stamping action and cassette 1 moving action and shutter 6 opening-closing action are linked with optimal timing. However, there are no limitations thereby, for example, it is possible to split power from the rotary drive shaft of stepper motor 37 to effect movement of cassette 1 and opening-closing of shutter 6. Or else, structure can be such that by providing separately an actuator for effecting movement of cassette 1 and opening-closing of shutter 6, and controlling this actuator, hot-stamping action and cassette 1 moving action and shutter 6 opening-closing action can be linked with optimal timing.

Further, according to hot-stamping device 7 of this invention, it is possible to exert pressure at constant load, even when there is variation in thickness of medium 2 that is stamping object, the amount of pressure exerted can also be controlled. Therefore, structure of hot-stamping device of this invention can be utilized in a small-size press device, etc., for example.

An explanation follows next, relating to hot-stamping device of this invention for transfer by pressure application of hot-stamping foil at optimal pressure and method of controlling stamping pressure in a hot-stamping device.

The constitution of this invention is explained in detail below, based on embodiment shown in figures.

Figure 21:
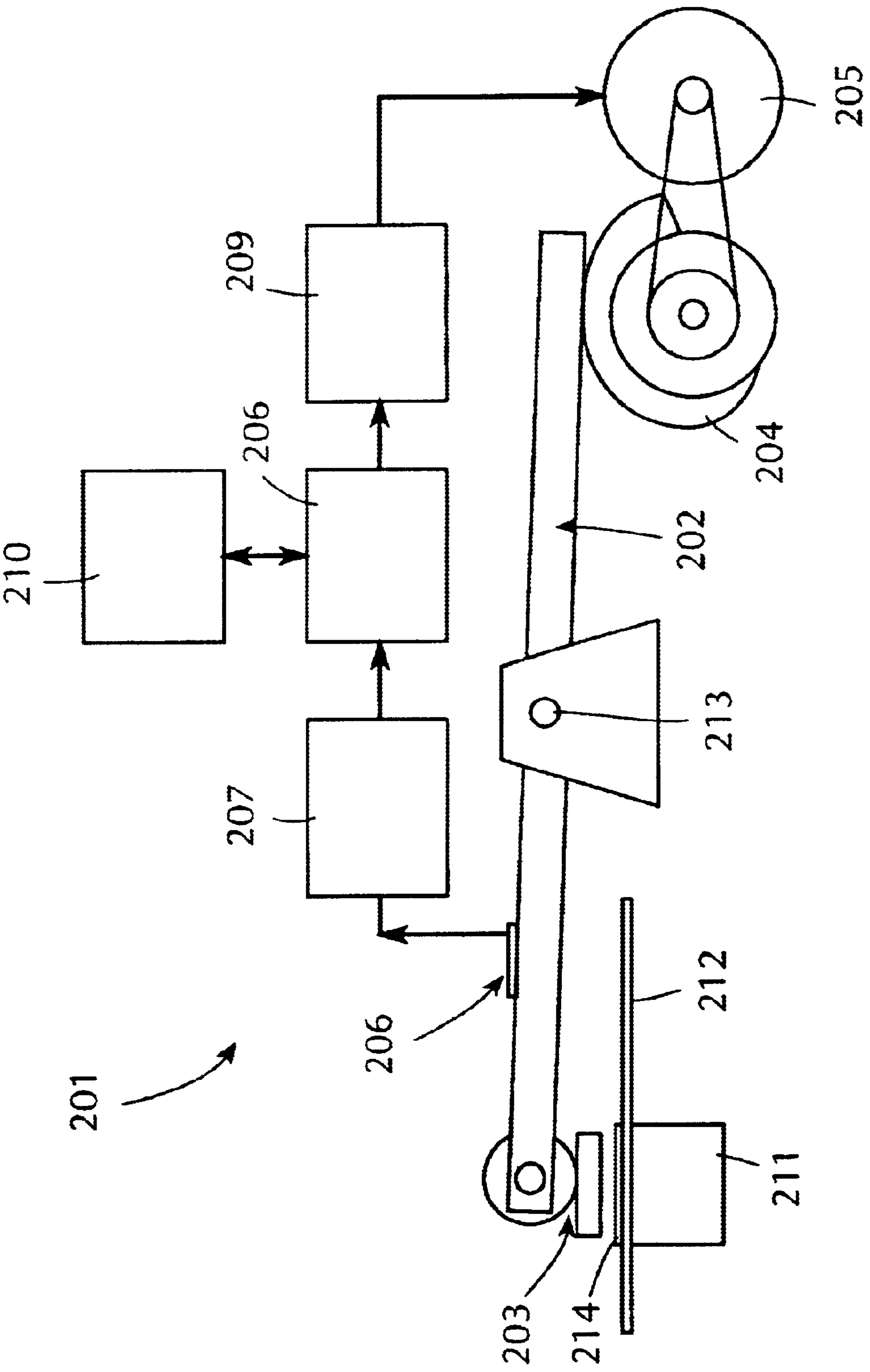
FIG. 21 is a block diagram showing one embodiment of a hot-stamping device of this invention.
Figure 22:
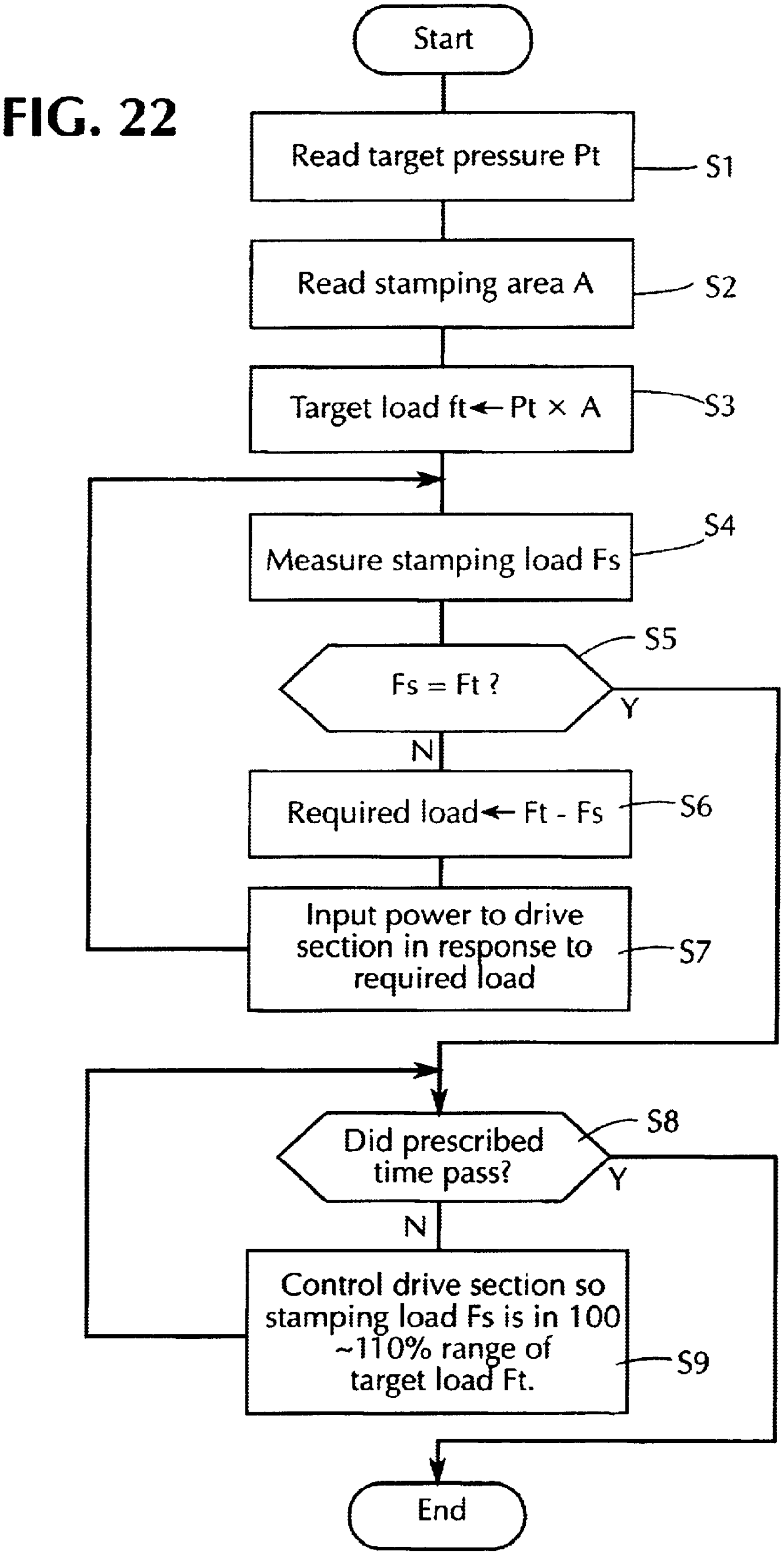
FIG. 22 is a flow chart showing one example of a process utilizing stamping pressure control method for a hot-stamping device of this invention.
Figure 23:
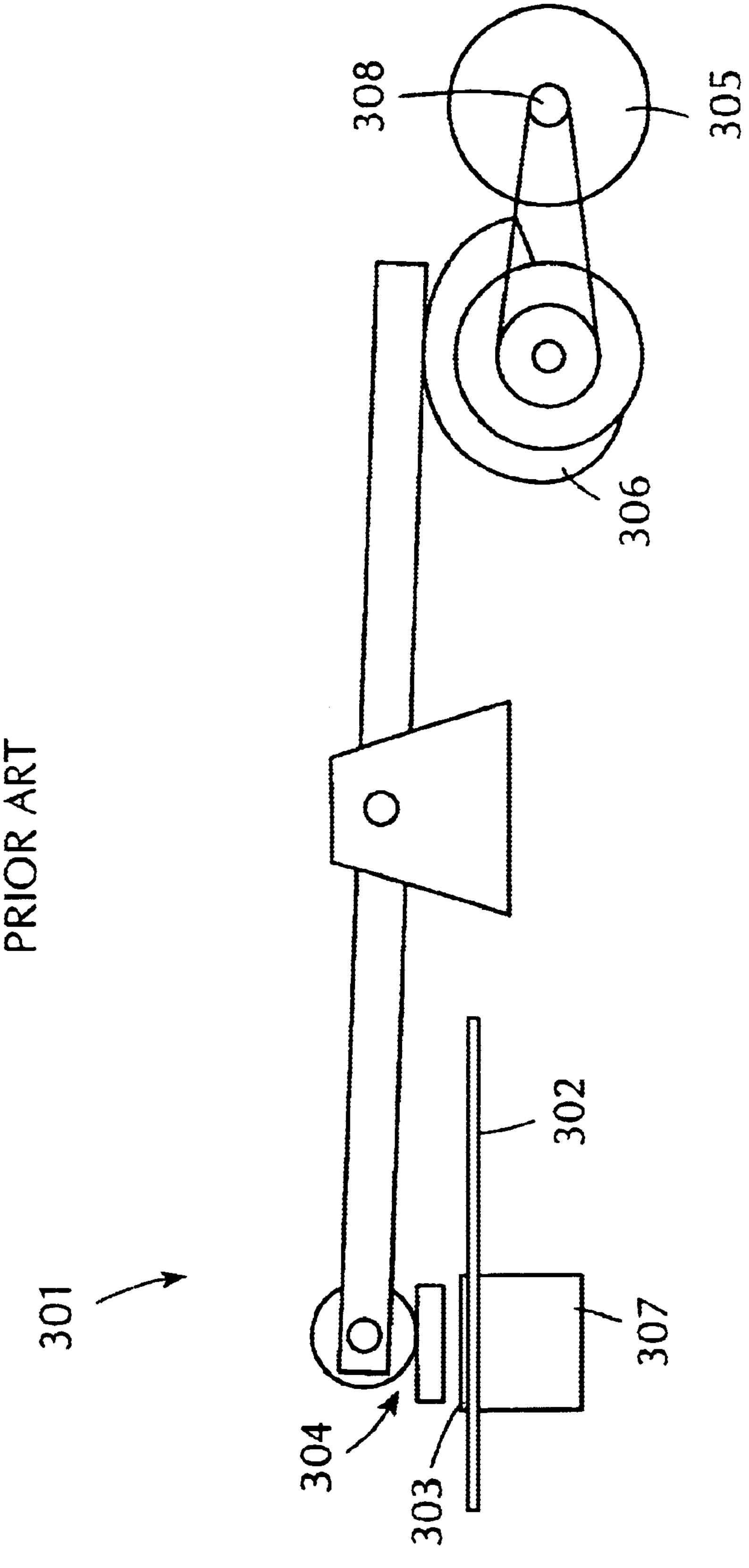
FIG. 23 PRIOR ART
FIG. 23 is simplified structural view showing one example of a conventional hot-stamping device.

One embodiment of hot-stamping device of this invention is shown in FIG. 21 and FIG. 22. This hot-stamping device 201 is device that has stamping arm 202 having one end as free end, and stamping section 203 positioned at said free end, that transfers hot-stamping foil 214 to value-added medium 212, and cam 204 in contact with stamping arm 202 as pressure application mechanism that brings pressure-exerting load to bear on stamping section 203, and drive section 205 that drives cam 204, strain detection device 206 is attached to stamping arm 202, stamping pressure Ps of stamping section 103 at a time of hot-stamping transfer is measured from output of strain detection device 206, stamping pressure Ps is compared to predetermined target pressure Pt to obtain required amount of pressure application, drive section 205 is controlled to add required amount of pressure to stamping section 203.

Strain detection device 206 is, for example, a strain gauge that detects strain as change in electrical resistance. Strain gauge 206 as shown in FIG. 21 in this embodiment, for example, is pasted in a location about midway between end where stamping section 203 is positioned and rotary shaft 213, on the top face side of stamping arm 202 in the figure that receives stress from compression at a time of hot-stamping. In other words, strain gauge 206 is pasted at location on stamping arm 202 receiving maximum stress at the time of hot-stamping, to detect strain on stamping arm 202 with good precision. However, the location of attachment of strain gauge 206 is not limited to the position shown in this embodiment, for example, it can be attached on the bottom face side of stamping arm 202 in this figure that receives tensile flexural stress at time of hot-stamping.

Output of strain gauge 206 is amplified by strain detection circuit 207 constituting Wheatstone bridge circuit, amplifier, A/D switching circuit, etc., converted to electrical voltage and converted A/D, and input to control section 208 constituting CPU (central processing unit). Control section 208 measures output of strain gauge 206.

Drive section 205 constitutes DC motor, for example. Motor 205 is connected to control section 208 through driver 209, is controlled by control section 208. Control section 208 controls motor 205 by means of PWM (Pulse Width Modulation) system, for example.

When motor 205 rotates, this rotation is conveyed to cam 204 in contact with stamping arm 202. Cam 204 rotates, according to the ring perimeter shape of cam 204, stamping arm 202 rotates with rotary shaft 213 as center, at position about midway in the lengthwise direction. By this means, stamping section 203 moves to come in contact with value-added medium 212 through hot-stamping foil 214. Further, as motor 205 rotates, load-exerting pressure is brought to bear on stamping section 203 to effect transfer of hot-stamping foil 214 to value-added medium 212. Hot-stamping foil 214 is, for example, holographic foil. Value-added medium 212 that becomes the object of hot-stamping is medium that has value as protection from wrongdoing such as counterfeiting, etc., or is medium that guarantees or certifies a fixed value, there are no particular limitations on the kind of medium and its form. As such value-added medium 212, there are, for example, negotiable instruments such as tickets, gift certificates, cards such as credit cards and the like, documents such as documents, official documents and the like. Furthermore, the form and constitution of drive section 205, stamping arm 202, cam 204 are not limited to those shown in FIG. 21. For example, there is no restriction that limits location of fulcrum of rotation of stamping arm 202 to a position about midway in the lengthwise direction. Further, it is also possible to use, for example, multiplicity of cam 204 and drive section 205 by separating use in movement and use in exerting pressure in stamping section 203.

Moreover, in hot-stamping device 201 in this embodiment, there is memory storage device 210 that stores the area of the part of stamping section 203 that comes in contact with value-added medium at time of hot-stamping, in other words, stamping area A. Memory storage device 210 uses, for example, rewritable non-volatile memory, EEPROM (Electrically Erasable Programmable Read Only Memory). However, the device is not limited to this, depending on the situation, it is possible to use other memory such as RAM (Random Access Memory) and the like. Memory storage device 210 (hereinafter termed memory 210 in this embodiment) is connected to control section 208. Control section 208 can read information stored in memory 210 and can also write necessary information in memory 210. Moreover, in hot-stamping device 201 it is possible to attach and exchange multiplicity of stamping section 203 appropriately, it is possible to store in memory 210 multiplicity of stamping area A corresponding to this multiplicity of stamping section 203. For example, when user inputs type and size of stamping section 203 by means of input device not shown in the figure, it is possible to select stamping area in response to this input.

Further, in this embodiment, the correlation between load (hereinafter termed stamping load Fs in this specification) generated in stamping section 203 at time of hot-stamping, and strain in stamping arm 202 is obtained beforehand. For example, load cell is used to measure stamping load Fs, from output of strain gauge 206 at time of this measurement, correlation equation is obtained between stamping load Fs and output of strain gauge 206. This resultant correlation equation is stored in memory 210, for example, control section 208 can thereby calculate stamping load Fs from output of strain gauge 206. Control section 208, by dividing this stamping load Fs by stamping area A stored in memory 210, can obtain stamping load per unit area, in other words, stamping pressure Ps generated in stamping section 203.

Stamping pressure Ps required for hot-stamping varies with the kind of hot-stamping foil 214 (for example, holographic foil). Further, depending on kind of value-added medium 212 (for example, ticket paper and plastic card, etc.) permissible stamping pressure Ps that does not damage value-added medium 212 varies. Therefore, in this embodiment, optimal stamping pressure (hereinafter, in this specification, termed target pressure Pt), in accordance with kind of hot-stamping foil 214 and kind of value-added medium 212 that is the object of hot-stamping, is obtained beforehand by performing stamping experiments using, for example, this hot-stamping foil 214 and this value-added medium 212. This target pressure Pt is stored, for example, in memory 210.

Moreover, it is possible to store in memory 210 a multiplicity of target pressures Pt corresponding to a multiplicity of hot-stamping foils 214 and a multiplicity of value-added mediums 212. For example, when the user inputs kind of hot-stamping foil 214 and kinds of value-added medium 212 by means of input device not shown in the figure, it is possible to select a target pressure Pt corresponding to this input from a multiplicity of target pressures Pt stored in memory 210. Further, it is possible to store correlation equation between thickness of a value-added medium 212 and target pressure Pt in memory 210. For example, when the user inputs thickness of value-added medium 212 by means of input device not shown in the figure, it is possible to calculate target pressure Pt corresponding to thickness of this value-added medium 212 based on target pressure Pt stored in memory 210. Further, by means of a key input by the user, it is possible to directly input value of target pressure Pt, further, it is also possible to adjust value of target pressure Pt by increasing and decreasing incrementally.

Next, one example of a stamping pressure control method in a hot-stamping device 201 constituted as above, is explained according to a flowchart shown in FIG. 22.

When value-added medium 212 is set in the predetermined stamping position, and stamping start button not shown in the figure is pushed, control section 208 reads fixed target pressure Pt stored in memory 210 (Step 1), then reads stamping area A stored in memory 210 (Step 2). Then, target pressure Pt is multiplied by stamping area A to obtain target load Ft (Step 3). Then as stamping load Fs is measured from output of strain gauge 206, motor 205 is driven until stamping load Fs matches target load Ft (Step 4~Step 7).

In other words, at fixed time intervals, control section 208 measures stamping load Fs from output of strain gauge 206 (Step 4), compares measured stamping load Fs and target load Ft (Step 5), if not in agreement (Step 5; No), required load to match stamping load Fs to target load Ft, in other words, the difference between target load Ft and stamping load Fs is obtained (Step 6), electric power in response to required load is input in motor 205 so this required load is added to stamping section 203 (Step 7). In other words, control section 208 performs feedback control of motor 205 to add required load to stamping section 203.

When stamping load Fs reaches target load Ft (Step 5; Yes), control section 208, until passage of predetermined time required for transfer of hot-stamping foil 214 (Step 8; No), controls motor 205 by means of PWM system so that stamping load Fs remains within the range of target load Ft, for example, 100~110%, (Step 9). Then, after predetermined time passes (Step 8; Yes), control section 208 rotates motor 205 in reverse to withdraw stamping section 203 from value-added medium 212, hot-stamping process is completed.

Furthermore, in the process described above, feedback control of motor 205 is implemented so that predetermined target pressure Pt is multiplied by stamping area A to obtain target load Ft, measured stamping load Fs and target load Ft are compared to obtain required load, this required load is added to stamping section 203, however, the process can be effected as follows, for example.

In other words, after stamping load Fs is measured from the output of strain gauge 206 at fixed time intervals, this stamping load Fs is divided by stamping area A stored in memory 210 to obtain stamping pressure Ps. Then measured stamping pressure Ps and target pressure Pt stored in memory 210 are compared, required pressure application (for example, amount of pressure required to match stamping pressure Ps to target pressure Pt, or to keep stamping pressure Ps within the range, for example, of 100~110% of target pressure Pt) is obtained, motor 205 is subjected to feedback control so this amount of required pressure is added to stamping section 203. In such process as well, the effect of this invention is the same.

As described above, according to hot-stamping device 201 of this invention, a stamping pressure control method for hot-stamping device 201, it is possible to implement hot-stamping regardless of size of a stamping area A at predetermined optimal stamping pressure, in other words, target pressure Pt. In other words, whether the size of stamping section 203 is large or small, or whether stamping area A is small because of engraving on the stamping face, uniform hot-stamping can be implemented continually at optimal pressure. Therefore, there are no problems such as unsatisfactory transfer of hot-stamping foil 214 because of weak stamping pressure Ps, or damage to value-added medium 212 and stamping section 203 because stamping pressure Ps is too strong.

Further, in hot-stamping device 201 of this invention and stamping pressure control method for hot-stamping device 201, because target load Ft is generated according to stamping area A, stamping area A is not limited to a fixed size, it is possible to select stamping section 203 optionally, whether size is large or small and engraving is present or absent.

Further, because an impression of excessively large load on a small-size stamping section 203 can be prevented, damage to a small-size stamping section 203 is prevented, further, this is linked to an extension of service life of stamping section 203.

Further, by setting common target pressure Pt corresponding to hot-stamping foil 214 being used and value-added medium 212 comprising stamping object in hot-stamping device 201, scatter in pressure application within the multiplicity of hot-stamping device 201 can be reduced.

Furthermore, the embodiment described above is one optimal example of this invention, but there are no limitations thereby, various different embodiments are possible as long as these stay within the range of the gist of this invention.

For example, the position of attachment of strain gauge 206 is not limited to the top face side in FIG. 21 of stamping arm 202 that receives flexural stress from compression at the time of hot-stamping, attachment is possible on the bottom face side in FIG. 21 of stamping arm 202 that receives tensile flexural stress at the time of hot-stamping. Moreover, a multiplicity of strain gauge 206 can be attached to stamping arm 202 to obtain multiplicity of output, to increase precision in measurement of stamping load Fs and stamping pressure Ps. Further, pressure application mechanism 204 is not limited to cam mechanism, screw mechanism and link mechanism are also possible.

Further, for example, it is possible to incorporate load cell in platen 211 that receives and supports value-added medium 212 at time of hot-stamping, so that stamping load Fs is obtained by means of this load cell.

It is clear from the above explanation that a hot-stamping device described constitutes a stamping section that transfers a hot-stamping foil to a value-added medium by application of pressure to a hot-stamping foil and a value-added medium, and stamping arm provided with stamping section on its leading edge, and a first cam that comes in contact with stamping arm to move the stamping section to close proximity to the value-added medium, and a first drive section that drives the first cam, and a second cam that brings pressure-exerting load to bear on stamping section moved to close proximity of value-added medium, and a second drive section that drives the second cam. Therefore, it is possible to move the stamping section quickly to close proximity of the value-added medium by means of the first cam, and to generate a pressure-exerting load required for a hot-stamping by means of the second cam. By these means, a hot-stamping can be performed with adequate stamping load and moreover, at high speed, without use of large-size cam construction or large-size motor. Furthermore, it is sufficient to ensure rigidity in sections in response to the second cam, without increasing rigidity in the entire device. Consequently, simplification, decrease in size and cost reduction of hot-stamping device can be realized. Furthermore, desired adjustment to a hot-stamping load is effected easily, by changing or adjusting the shape, the amount of rotation, the rotation speed, etc. of the first cam and the second cam. Therefore, a hot-stamping device is provided that is small in size but has high utility.

Moreover, in the hot-stamping device the hot-stamping foil is a hot-stamping foil tape, this hot-stamping foil tape is stored in a cassette equipped with windup reel and sendout reel, so in case of changeover to a different hot-stamping foil tape, exchange of cassettes can be performed easily, in comparison to the conventional open reel construction, it is easy to effect exchange operation.

Furthermore, in the hot-stamping device a cassette may be moved to come in contact with a value-added medium by means of the first drive, so a value-added medium is in a fixed position, shifting in a hot-stamping can be prevented. Further, floating of a value-added medium at the time of peeling hot-stamping foil tape from value-added medium is prevented. Consequently, satisfactory hot-stamping can be implemented.

Furthermore, the hot-stamping device may have a position where a cassette comes in contact with a value-added medium at a hot-stamping base position, and a stamping section is moved to a base position by the first cam drive, pressure-exerting load is brought to bear on stamping section by the second cam drive at the base position. Therefore, even when there is width and thickness to value-added medium, it is possible to bring fixed pressure-exerting load to bear at a level where there are no problems from a practical standpoint, uniform and moreover, satisfactory hot-stamping becomes possible regardless of the kind of value-added medium.

It is clear from the above explanation that the hot-stamping device described may use a strain detection device attached to a stamping arm, so that a stamping pressure of stamping section at the time of hot-stamping transfer is measured from the output of the strain detection device, so that a required pressure application is obtained by comparing stamping pressure and predetermined target pressure, the drive section is controlled to apply the amount of required pressure to stamping section. Therefore, regardless of size of a stamping area, in other words, whether the size of stamping section is large or small, or whether stamping area is small because of engraving on the stamping face, a uniform hot-stamping can be implemented continually at an optimal stamping pressure. Therefore, there are no problems such as unsatisfactory transfer of hot-stamping foil because of weak stamping pressure, or damage to value-added medium and stamping section because stamping pressure is too strong. Further, because application of excessively large load on small-size stamping section can be prevented, this is linked to extension of service life of stamping section.

Further, in the stamping section, because stamping area is not limited to a fixed size, various options are possible in stamping section such as size and presence or absence of engraving.

Further, by setting a common target pressure corresponding to a hot-stamping foil being used and value-added medium comprising a stamping object in a hot-stamping device, scatter in a pressure application within a multiplicity of hot-stamping device can be reduced.

Furthermore, because a hot-stamping device described in claim 6 is equipped with a memory storage device for storing a stamping area of stamping section, the user does not need to input stamping area during hot-stamping process, hot-stamping process that implements uniform hot-stamping at optimal stamping pressure can be automated.

Further, in a stamping pressure control method in hot-stamping device strain detection device is attached to stamping arm, a stamping load of stamping section at time of hot-stamping transfer is measured from output of strain detection device, predetermined target pressure is multiplied by a stamping area of a stamping section to obtain target load, stamping load and target load are compared to obtain required load, drive section is controlled to add required load to a stamping section; therefore, regardless of size of stamping area, in other words, whether size of stamping section is large or small, or whether stamping area is small because of engraving on the stamping face, uniform hot-stamping can be implemented continually at optimal pressure.

In further detail, this invention relates to a hot-stamping device using a medium with a thickness and a width and used as a hot-stamping object. Furthermore, this invention relates to a hot-stamping device for pressure transfer of a hot-stamping foil at an optimal pressure and a stamping pressure control method for a hot-stamping device.

While the foregoing description and drawings represent the preferred embodiments of the present invention, it will be obvious to those skilled in the art that various changes and modifications may be made therein without departing from the true spirit and scope of the present invention.

What is claimed is:

1. A hot-stamping device comprising:

a stamping arm with one end being a free end, a stamping section adapted to apply pressure to a hot-stamping foil positioned at said free end and to a value-added medium wherein said hot-stamping foil is transferred to said value-added medium;

a first cam, in contact with said stamping arm, for moving said stamping section to close proximity of said value-added medium;

a first drive section driving said first cam;

a second cam for bringing pressure-exerting load to bear on said stamping section moved to close proximity of said value-added medium; and a second drive section driving said second cam.

2. The hot-stamping device of claim 1, wherein said hot-stamping foil is hot-stamping foil tape, said hot-stamping foil tape storable in a cassette equipped with a windup reel and a sendout reel.

3. The hot-stamping device of claim 1, wherein said cassette is moveable by means of said first cam drive to come in contact with said value-added medium.

4. The hot-stamping device of claim 3, wherein a hot-stamping base position is positioned where said cassette comes in contact with said value-added medium;

said stamping section being moveable to said base position by means of said first cam drive;

said stamping section structured to exert load-exerting pressure being brought to bear on said stamping section at said base position by means of said second cam drive.

5. A hot-stamping device comprising:

a stamping arm with one end being a free end;

a stamping section positioned at said free end to transfer hot-stamping foil to a value-added medium;

a pressure application mechanism in contact with said stamping arm to bring pressure-exerting load to bear on said stamping section;

a drive section driving said pressure application mechanism; and a strain detection device attached to said stamping arm, wherein a stamping pressure of said stamping section at a time of hot-stamping transfer is measurable from an output of said strain detection device wherein said drive section includes means to controllably apply a required amount of pressure application obtained by comparing said stamping pressure and a predetermined target pressure wherein said required pressure is applied to said stamping section.

6. The hot-stamping device of claim 5, wherein a memory storage device is provided to store a stamping area value of said stamping section.

* * * * *